(12) United States Patent
Rumpf et al.

(10) Patent No.: US 10,824,045 B2
(45) Date of Patent: Nov. 3, 2020

(54) SPATIALLY VARIANT PHOTONIC CRYSTAL APPARATUS, METHODS, AND APPLICATIONS

(71) Applicant: University of Central Florida Research Foundation, Inc., Orlando, FL (US)

(72) Inventors: Raymond C. Rumpf, El Paso, TX (US); Stephen Kuebler, Orlando, FL (US); Noel P. Martinez, El Paso, TX (US); Cesar Luis Valle, El Paso, TX (US)

(73) Assignees: UNIVERSITY OF CENTRAL FLORIDA RESEARCH FOUNDATION, Orlando, FL (US); THE UNIVERSITY OF TEXAS AT EL PASO, Austin, TX (US)

( * ) Notice: Subject to any disclaimer, the term of this patent is extended or adjusted under 35 U.S.C. 154(b) by 61 days.

(21) Appl. No.: 15/627,060

(22) Filed: Jun. 19, 2017

(65) Prior Publication Data
US 2017/0363931 A1 Dec. 21, 2017

Related U.S. Application Data

(60) Provisional application No. 62/351,565, filed on Jun. 17, 2016.

(51) Int. Cl.
*G02F 1/29* (2006.01)

(52) U.S. Cl.
CPC .......... *G02F 1/293* (2013.01); *G02F 2201/38* (2013.01); *G02F 2202/32* (2013.01)

(58) Field of Classification Search
CPC .... G02B 1/005; G02B 5/3016; G02B 6/1225; G02B 2006/1213; B82Y 20/00; H01L 33/04
USPC .................................. 359/298–320, 326–332
See application file for complete search history.

(56) References Cited

U.S. PATENT DOCUMENTS

| | | | | |
|---|---|---|---|---|
| 4,712,877 A | * | 12/1987 | Okada | G02F 1/133371 345/88 |
| 2001/0012149 A1 | * | 8/2001 | Lin | B82Y 20/00 359/344 |
| 2016/0036132 A1 | * | 2/2016 | Rumpf | H01Q 1/526 343/909 |
| 2018/0246262 A1 | * | 8/2018 | Zhan | G02B 5/1871 |

OTHER PUBLICATIONS

Bosiljevac et al., "Non-Uniform Metasurface Luneburg Lens Antenna Design," *Antennas Propag. IEEE Trans.* 2012, 60:4065-4073.
(Continued)

*Primary Examiner* — Mahidere S Sahle
(74) *Attorney, Agent, or Firm* — Klintworth & Rozenblat IP LLP

(57) ABSTRACT

Embodiments of the invention are directed compositions and devices that include a spatially-variant lattice (SVL), such as spatially variant photonic crystals (SVPC), as well as methods for making and using the same. In particular, the compositions and devices include SVPCs that are configured for manipulating the path and/or properties of electromagnetic radiation flowing through the SVPC in a variety of ways.

17 Claims, 19 Drawing Sheets

(56) References Cited

OTHER PUBLICATIONS

Cassan et al., "Short-Wavelength Light Propagation in Graded Photonic Crystals," *J. Lightwave Technol.* 2011, 29:1937-1943.

Cenieno et al., "Graded photonic crystals," *Opt. Lett.* 2005, 30:2278-2280.

Centeno et al., "Mirage and superbending effect in two-dimensional graded photonic crystals," *Phys. Rev. B* 2006, 73:235119.

Chen et al., "Transformation optics and metamaterials," *Nat. Mater.* 2010, 9:387-396.

Chutinan et al., "Highly confined waveguides and waveguide bends in three-dimensional photonic crystal," *Appl. Phys. Lett.* 1999, 75:3739-3741.

Chutinan et al., "Waveguides and Waveguide bends in two-dimensional photonic crystal slabs," *Phys. Rev. B* 2000, 62:4488-4492.

Digaum et al., "Tight control of light beams in photonic crystals with spatially-variant lattice orientation," *Opt. Express* 2014, 22:25788-25804.

Do et al., "Experimental demonstration of light bending at optical frequencies using a non-homogenizable graded photonic crystal," *Opt. Express* 2012, 20:4776-4783.

Doany et al., "Terabit/s-class optica PCB links incorporating 360-Gb/s bidirectional 850 nm parallel optical transceivers," *J. Lightwave Tech.* 2012, 30:560-571.

Faenzi et al., "Metasurface leaky-wave antennas: A comparison between slot and patch implementation," *In Proc. 8th European Conf. on Antennas and Propagation (EuCAP)*, 2014, The Hague, The Netherlands, 1234-37, Piscataway, NJ: IEEE, pp. 1234-1237.

Farmahini-Farahani et al., "Functional-Graded Index Metasurfaces for Infrared Radiation and Guiding," *IEEE Trans. Nanotechnol.* 2015, 14:75-81.

Frandsen et al., "Broadband photonic crystal waveguide 60° bend obtained utilizing topology optimization," *Opt. Express.* 2004, 12:5916-5921.

Gabrielli et al., "On-chip transformation optics for multimode waveguide bends," 2012, *Nat. Commun.* 3:1217.

Gaillot et al., "An all-dielectric route for terahertz cloaking," *Opt. Express* 2008, 16:3986-3992.

Gao et al., "Self-collimated waveguide bends and partial bandgap reflection of photonic crystals with parallelogram lattice," 2008, *J. Opt. Soc. Am A*, 25:791-795.

Hakamata et al., "Diffractive optical elements using the subwavelength scale pillar array structure," 2004, *Proc. SPIE* 5360:411-418.

Hamam et al. "Broadband super-collimation in a hybrid photonic crystal structure," *Opt. Express* 2009, 17:8109-8118.

Hayashi et al., "Plasmonics: visit the past to know the future," *J. Phys. D Appl. Phys.*, 2012, 45(43):433001-43324.

Holloway et al., "An overview of the theory and applications of metasurfaces: The two-dimensional equivalents of metamaterials," 2012, *Antennas Propag. Mag. IEEE* 54:10-35.

Illiew et al., "Self-collimation of light in three-dimensional photonic crystals," 2005, *Opt. Exp.* 13:7076-7085.

Kildishev et al., "Planar Photonics with Metasurfaces," 2013, *Science* 339:1232009.

Kim et al., "Propagation of spoof surface plasmon on metallic square lattice: bending and splitting of self-collimated beams," 2014, *Opt. Express* 22:4050-4058.

Kosaka et al., "Self-collimating phenomena in photonic crystals," 1999, *Appl. Phys. Lett.* 74:1212-1214.

Kurt et al., "The focusing effect of graded index photonic crystals," 2008, *Appl. Phys. Lett.* 93:171108.

Kwon et al., "Transformation electromagnetics: an overview of the theory and applications," 2010, *IEEE Antennas Propag. Mag.* 52:24-46.

Lafratta et al., "Multiphoton fabrication," 2007, *Agnew. Chem. Int. Ed.*, 46:6238-6258.

Larouche et al., "Infrared metamaterial phase holograms," 2012, *Nat. Mater.* 11:450-454.

Li et al., "Multiphoton polymerization," 2007, *Mater. Today* 10:30-37.

Li et al., "Light coupling with multimode photonic crystal waveguides," 2004, *Appl. Phys. Lett* 84:4699-4701.

Li et al., "Graded wavelike two-dimensional photonic crystal made of thin films," 2008, *Appl. Opt.* 47:C70-C74.

Lin et al., "Dielectric gradient metasurface optical elements," 2014, *Science* 345:298-302.

Liu et al., "Compact bends for multi-mode photonic crystal waveguides with high transmission and suppressed modal crosstalk," 2013, *Opt. Express* 21:8069-8075.

Lu et al., "Experimental Demonstration of Self-Collimation inside a Three-Dimensional Photonic Crystal," 2006, *Phys. Rev. Lett.* 96:173902.

Lutkenhaus et al., "Holographic fabrication of functionally graded photonic lattices through spatially specified phase patterns," 2014, *Appl. Opt.* 53:2548-2555.

Marcatili, "Bends in optical dielectric guides," *Bell System Technical Journal*, 1969, 48(7):2103-2132.

Mehta et al., "Nanofabrication of a space-variant optical transmission filter," 2006, *Opt. Lett.* 31:2903-2905.

Mehta et al., "Spatially polarizing autocloned elements," 2007, *Opt. Lett.* 32:1935-1937.

Meinzer et al., "Plasmonic meta-atoms and metasurfaces," 2014, *Nat. Photonics* 8:889-898.

Mekis et al., "High Transmission through Sharp Bends in Photonic Crystal Waveguides," 1996, *Phys. Rev. Lett.* 77: 3787-3790.

Oh et al., "Self-collimation phenomena of surface waves in structured perfect electric conductors and metal surfaces," 2007, *Opt. Express* 15:1205-1210.

Oner et al., "High-efficiency beam bending using graded photonic crystals," 2013, *Opt. Lett.* 38:1688-1690.

Pendry et al., "Controlling Electromagnetic Fields," 2006, *Science* 312:1780-1782.

Roth et al., "Azimuthally Varying Guided Mode Resonance Filters," 2012, *Micromachines* 3:180-193.

Rumpf et al., "Synthesis of spatially variant lattices," 2012, *Opt. Exp.* 20:15263-15274.

Rumpf et al., "Optimization of planar self-collimating photonic crystals," 2013, *J. Opt. Soc. Am. A*, 30:1297-1304.

Rumpf et al., "3D Printed Lattices with Spatially Variant Self-Collimation," 2013, *Prog. Electromag. Res.* 139:1-14.

Rumpf et al., "Design and optimization of space-variant photonic crystal filters," 2007, *Appl. Opt.* 46:5755-5761.

Rumpf et al., "Guided-Mode Resonance Filter Compensated to Operate on a Curved Surface," 2013, *Prog. Electromag. Res. C* 40:93-103.

Rumpf, "Simple Implementation of Arbitrarily Shaped Total-Field/Scattered-Field Regions in Finite-Difference Frequency-Domain," 2012, *Prog. Electromag. Res. B* 36:221-248.

Sano et al., "Fabrication of Metal Photonic Crystals with Graded Lattice Spacing by Using Micro-Stereolithography," 2010, *Mater. Sci. Forum* 631-632:287-292.

Schurig et al., "Metamaterial Electromagnetic Cloak at Microwave Frequencies," 2006, *Science* 314:977-980.

Shin et al., "Conditions for self-collimation in three-dimensional photonic crystals," 2005, *Opt. Lett.* 30:2397-2399.

Sihvola, "Metamaterials in electromagnetics," 2007, *Metamaterials* 1:2-11.

Smith et al., "Metamaterials and Negative Refractive Index," 2004, *Science* 305:788-792.

Srimathi et al., "Fabrication of metal-oxide nano-hairs for effective index optical elements," 2013, *Opt. Exp.* 21:18733-18741.

Srinivasan et al., "Spatial and spectral beam shaping with space-variant guided mode resonance filters," 2009, *Opt. Exp.* 17:20365-20375.

Sun et al., "Luneburg lens composed of sunflower-type graded photonic Crystals," 2014, *Opt. Commun.* 315:367-373.

Tokushima et al., "Lightwave propagation through a 120° sharply bent single-line-defect photonic crystal waveguide," 2000, *Appl. Phys. Lett.* 76:952-954.

(56) References Cited

OTHER PUBLICATIONS

Tsakmakidis et al., "Extreme control of light in metamaterials: Complete and loss-free stopping of light," *Physica B: Condensed Matter*, 2012, 407(20):4066-4069.
Vasic et al., "Controlling electromagnetic fields with graded photonic crystals in metamaterial regime," 2010, *Opt. Exp.* 18:20321-20333.
Vasic et al., "Self-focusing media using graded photonic crystals: Focusing, Fourier transforming and imaging, directive emission, and directional cloaking," 2011, *J. Appl. Phys.* 110:053103.
Wan et al., "A broadband transformation-optics metasurface lens," 2014, *Appl. Phys. Lett.* 104:151601.
Wan et al., "Planar bifunctional Luneburg-fisheye lens made of an anisotropic metasurface," 2014, *Laser Photonics Rev.* 8:757-765.
Wang et al., "High transmission efficiency of arbitrary waveguide bends formed by graded index photonic crystals," 2011, *J. Opt. Soc. Am. B* 28:2098-2104.
Williams et al., "Effect of refractive index mismatch on multi-photon direct laser writing," 2012, *Opt. Express* 20:25030-25040.
Witzens et al., "Self-collimation in planar photonic crystals," 2002, *Sel. Top. Quantum Elect. IEEE J.* 8:1246-1257.
Yu et al., "Flat optics with designer metasurfaces," 2014, *Nat. Mater.* 13:139-150.
Yu et al., "Designer spoof surface plasmon structures collimate terahertz laser beams," 2010, *Nat. Mater.* 9:730-735.
Yu et al., "Flat optics: Controlling wavefronts with optical antenna metasurfaces," 2013, *IEEE J. Sel. Top. Quantum Electron.* 19:4700423.

\* cited by examiner

SPATIALLY VARIANT PHOTONIC CRYSTAL APPARATUS, METHODS, AND APPLICATIONS

CROSS REFERENCE TO RELATED APPLICATIONS

The present application claims priority to U.S. Application No. 62/351,565 filed Jun. 17, 2016, which is incorporated herein by reference in its entirety.

STATEMENT REGARDING FEDERALLY FUNDED RESEARCH

This invention was made with government support under N66001-11-1-415 awarded by the DARPA; DMR/CHE-0748712 awarded by NSF; 0840431 awarded by NSF; and N66001-11-1-415 awarded by DARPA. The government has certain rights in the invention.

BACKGROUND OF THE INVENTION

A. Field of the Invention

The invention generally concerns compositions and devices that include a spatially-variant lattice (SVL), such as a spatially variant photonic crystal (SVPC) as well as methods for making and using the same. In particular, the compositions and devices include SVPC that are configured for manipulating the path and/or properties of electromagnetic radiation flowing through the SVPC in a variety of ways.

B. Description of Related Art

The development of complex integrated optical circuits requires efficient and controlled transport of data by bending and steering light signals. Waveguides (Marcatili, *Bell System Technical Journal*, 1969, 48(7):2103-32), photonic crystals (Hayashi and Okamoto, *J. Phys. D Appl. Phys.*, 2012, 45(43):433001-24), plasmonic devices (Brongersma and Kik, *Surface plasmon nanophotonics*, Springer series in optical sciences, Springer, Netherlands, 2007, Vol. 131), and metamaterials (Tsakmakidis and Hess, *Physica B: Condensed Matter*, 2012, 407(20):4066-69) have all been explored as means for controlling light beams. Waveguides control light through total internal reflection. Achieving complete beam bending, without optical loss, requires a waveguide with a bend radius $R_{bend}$ that is often thousands of times larger than the wavelength of light in a vacuum ($\lambda_0$). This prevents miniaturization of optical circuits, and limits their use in integrated photonic circuits. Graded photonic crystals, plasmonic devices, and metamaterials on the other hand, are capable of bending light beams through sharp turns; however, these approaches require complex fabrication processes and impractical materials with exotic optical properties, some of which can result in high Ohmic loss. Even more, most optical devices are refraction based so the angle of a transmitted beam is directly related to the angle of an input beam. This relation limits the range of possible things a conventional optical device can accomplish.

SUMMARY OF THE INVENTION

A SVL or SVPC, as described herein, provides a solution to the problems associated with devices that manipulate electromagnetic radiation, e.g., light. In particular, aspects of embodiments provide methods for configuring an SVL or SVPC to achieve improved manipulation of the electromagnetic radiation entering and leaving an SVL or SVPC. By way of example, the inventors have discovered a process to funnel electromagnetic radiation as well as to form SVL or SVPCs with multiplexed functionality that can manipulate two or more attributes of electromagnetic radiation.

Periodic structures, or lattices, have proven to be one of the most enabling technologies of the 21st century. They have allowed the manipulation light and sound like electricity is manipulated in computer chips, to dramatically reduce size and weight of structures while maintaining strength, to make objects invisible, appear to break the laws the physics, and much more. Periodic structures in electromagnetics include metamaterials, metasurfaces, photonic crystals, frequency selective surfaces, array antennas, and gratings. Periodic structures can be found through many areas of science including electromagnetics, optics, mechanics, acoustics, structures, bioengineering, and more.

Metamaterials are composite materials, usually comprised of a periodic array of metallic elements, that interact with an applied wave to provide new materials that are not otherwise attainable with naturally occurring materials. This is typically effective permittivity $\epsilon$, permeability $\mu$, and conductivity $\sigma$ properties. The period, or lattice spacing, of a metamaterial is small enough that the lattice does not cause any scattering of the wave. Usually this is well below a quarter wavelength.

Metasurfaces are mostly planar structures that manipulate a wave passing through it. The metasurface can modified the waves amplitude, phase, and polarization. Like metamaterials, metasurfaces have a period that is small enough that the lattice does not diffract a wave. They are typically constructed of an array of planar metallic elements arranged in a 2D plane.

Photonic crystals are also periodic structures, but the period is large enough that they scatter waves. This gives rise to a very complex arrangement of waves and interference inside the lattice that gives the structures properties analogous to how electrons are controlled in semiconductors. The label "photonic crystal" is to draw an analogy to real crystals. Due to the larger lattice spacing, photonic crystals are most practical at frequencies where the wavelength is small enough where a sufficient number of unit cells can be accommodated. This seems to be mostly at wavelengths shorter than 10 mm. Photonic crystals are most well known for applications at optical frequencies, but many applications can also be found at microwave, millimeter wave, and terahertz frequencies.

Frequency selective surfaces (FSSs) are mostly planar structures like metasurfaces, but the period can be larger and may also diffractive waves. FSSs are mostly used to filter the frequency content of electromagnetic radiation. They are most famous for their use in stealth.

Antenna arrays tend to look very much like frequency selective surfaces and/or metasurfaces, but each element in the lattice is an antenna and fed its own signal to be radiated. Each element in the array emits a unique signal so that the array acts like one large antenna where the amplitude, phase, and polarization of the beam can be tailored across the array. With phased array antennas, the timing is varied between the signals delivered tot each element in order to electronically steer the beam emitting from the array without requiring any moving parts.

Gratings are periodic structures that diffract waves. The angle of diffraction is frequency dependent so gratings are used extensively in spectrometers and other sensing applications. Resonant gratings, or guided-mode resonance filters, are both waveguides and gratings at the same time. Under special conditions, the grating can diffract an applied wave into a guided mode inside the waveguide. This guided mode also experiences the grating and eventually leaks from the waveguide. The interference between the applied wave and the leaked wave produce an overall filter response.

Although all periodic structures are truly inhomogeneous, note that uniform lattices are macroscopically homogeneous over length scales that are large compared to the unit cell, but microscopically inhomogeneous over length scales that are comparable to the of the unit cell. We can thus associate the actual inhomogeneity of periodic structures as being microscopically inhomogeneous.

Waves (electromagnetic, acoustic, vibrational, etc.) cannot be controlled inside of homogeneous media. Some sort of inhomogeneity must exist for anything useful to happen to a wave. The inhomgeneity could be a material interface, a curve, a gradient, and more. Uniform lattices can be compared to homogeneous materials which have limited usefulness. A tremendous range of useful properties and functions remains inaccessible inside of periodic structures, unless they can be made macroscopically inhomogeneous. Periodic structures can be made macroscopically in homogeneous by changing its geometric attributes as a function of position. However, this must be accomplished without also weakening or destroying their unusual properties. To do this, lattices must be bent, twisted, and otherwise spatially varied without also deforming the size and shape of their unit cells. This requires seemingly impossible geometries, so it has only been accomplished in very limited configurations [Phil. Trans. A 373: 20140359, 2015]. Technology for designing and manufacturing SVLs has recently converged, finally making it possible to explore SVLs and to make fundamental discoveries in this new field with broad implications. Simple planar gratings are 3D functions that vary in one direction only. They are typically defined by their complex amplitude a and grating vector $\vec{K}$ according to $$\varepsilon_a(\vec{r})=\text{Re}\{a\exp(j\vec{K}\cdot\vec{r})\} \quad (A1)$$

where Re{ } extracts only the real part of its argument, j is the square root of negative one, and $\vec{r}=x\hat{a}_x+y\hat{a}_y+z\hat{a}_z$ is position in space expressed as a Cartesian vector. The grating vector conveys two pieces of information, the orientation and the period of the grating. First, the planes of the grating are oriented perpendicular to the direction of the grating vector. Second, the magnitude of the grating vector is $2\pi$ divided by the spacing between adjacent planes of the grating.

To spatially vary the planar grating, its amplitude a or grating vector $\vec{K}$ are made to vary as a function of position. This is can be easily accomplished for a ($\vec{r}$), however Equation (A1) fails to calculate the grating correctly when the grating vector becomes of a function of position, $\vec{K}(\vec{r})$. In this case, it is necessary to define an intermediate parameter called the grating phase $\Phi(\vec{r})$. The grating vector and grating phase are related through equation (A2).

$$\nabla\Phi(\vec{r})=\vec{K}(\vec{r}) \quad (A2)$$

When the grating vector is a function of position, Equation (A2) is solved for the grating phase using a variety of numerical techniques such as, but not limited to, the finite-difference method or the finite element method. Given a the grating phase, the spatially-variant planar grating is calculated according to equation (A3)

$$\varepsilon_a(\vec{r})=\text{Re}\{a\exp[j\Phi(\vec{r})]\} \quad (A3)$$

This equation effectively replaces Equation (A1), but correctly calculates a spatially-variant planar grating.

The grating phase $\Phi(\vec{r})$ is a scalar quantity and the grating vector $\vec{K}(\vec{r})$ is a vector quantity. For this reason, an exact solution to Equation (A2) is not possible since we are trying to control three scalar functions (x, y, and z components of the grating vector function) with a single scalar function (grating phase). Instead, this equation is solved as a best fit using an algorithm like least-squares. As a result of this, the planar grating may not turn out to exactly match the original grating vector function, called the target K-function, $\vec{K}_T(\vec{r})$. While the algorithm does an amazing job at minimizing unintentional deformations to the planar grating, some still remain. To quantify these, Equation (A2) is solved for the actual grating vector function $\vec{K}_a(\vec{r})$ of the spatially-variant planar grating. Because a best fit is employed, $\vec{K}_a(\vec{r})\neq\vec{K}_T(\vec{r})$.

Certain parts of this invention describe improvements to the basic algorithm above that generate improved spatially variant planar gratings. To do this, something must be sacrificed. For example, the period of the planar grating can be made more constant if the orientation can be partly sacrificed. The orientation of the planar grating can made more constant if the period can be partly sacrificed. It is possible to improve both the period and orientation certain critical regions of a lattice if other regions can be sacrificed. It is also possible to implement any of the above improvements in any combination.

In a particular aspect, the a spatially variant planar grating is produced by the steps of: (a) constructing a first target K-function and calculating a first grating phase; (b) constructing a second K-function, the second K-function incorporating an (i) orientation bias, (ii) grating period bias, or (iii) grating critical region bias, and calculating a second grating phase; (c) repeating steps (a) and (b) until difference between successive grating phase calculation are sufficiently similar; (d) calculating an analog grating; (e) applying a threshold; and (f) synthesizing a spatially-variant planar grating determined by steps (a)-(e).

As described herein, the algorithm to generate spatially-variant planar gratings. This algorithm can be generalized to spatially vary any unit cell throughout any number of dimensions. The geometric attributes that can be spatially varied include unit cell orientation, lattice spacing (or period), symmetry (i.e. cubic, hexagonal, etc.), fill factor, pattern within the unit cell, and material composition. To do this, a unit cell can be decomposed through a Fourier transform into a set of planar gratings, each with its own complex amplitude $a_i$ and grating vector $\vec{K}_i$. To spatially vary a lattice, it is necessary to spatially vary the complex amplitudes $a_i(\vec{r})$ and grating vectors $\vec{K}_i(\vec{r})$ in the same manner and summing the results according to equation (A17).

$$\varepsilon_a(\vec{r})=\sum_i\text{Re}\{a_i(\vec{r})\exp[j\Phi_i(\vec{r})]\} \quad (A17)$$

This summation gives the "analog grating" $\varepsilon_a(\vec{r})$ which can be appropriately scaled to give realistic material properties. It is usually desired to generate binary structures that are composed of just two different materials, often air and a dielectric or metal. To this, it is only necessary to apply a threshold function $\gamma(\vec{r})$ to the analog grating.

$$\varepsilon_b(\vec{r}) = \begin{cases} \varepsilon_1 & \varepsilon_a(\vec{r}) \leq \gamma(\vec{r}) \\ \varepsilon_2 & \varepsilon_b(\vec{r}) > \gamma(\vec{r}) \end{cases} \quad (A4)$$

As previously mentioned, some lattices will be generated with unintentional deformations that can quantified through the actual grating vector functions $\vec{K}_a(\vec{r})$. In these cases, it is usually possible to compensate for these deformation by spatially varying at least one other attribute of the lattice. As an example, if the lattice spacing in a portion of the lattice is too small, the electrical size of the unit cells can be increased by increasing the fill factor of the lattice by adjusting the threshold function in accordance to the deformation. If the lattice spacing in a portion of the lattice is too large, the electrical size of the unit cells can be decreased by decreasing the fill factor of the lattice by adjusting the threshold function in accordance to the deformation.

Self-collimation is a phenomenon observed in photonic crystals where beams propagate without diverging and are forced to propagate along an axis of the lattice.

Given the ability to bend, twist, and otherwise spatially-vary a self-collimating photonic crystal, now called a spatially-variant photonic crystal (SVPC), electromagnetic waves can be made to propagate along determined paths simply by orientating all of the unit cells to point in the direction of the defined path. This can be done by defining an orientation function $\theta(\vec{r})$ that points in the direction of the path. Then in the algorithm described above, the orientation function is used to generate the K-functions for each of the planar gratings in the decomposition. The final lattice will flow a beam along the desired path and keep the beam from diverging or converging while inside the lattice.

In another embodiment, a SVPC may be spatially varied so as to flow incident waves to a common collection region. In principle, this can be done simply by orienting all of the unit cells so that they point to the collection region. Practical considerations may require curved paths or lattices to be composed of different regions. This concept is being called a photon funnel when used at optical frequencies. The photon funnel will have the ability to flow electromagnetic waves to common collection region independent of the angle or position of incidence of the applied beam.

Given the ability to spatially vary multiple attributes at the same time and each in a unique pattern, it becomes possible to multiplex different functions within the same lattice. In a broad sense, it becomes possible to decouple phase, power, and polarization of an electromagnetic wave and control them independently while inside the SVPC. In one embodiment, the longitudinal orientation of the unit cells controls the direction that power flows, the transverse orientation of the unit cells controls polarization, and gradients in the effective refractive index (typically done by spatially varying fill factor and/or lattice spacing) controls phase.

In one embodiment, fill factor can be adjusted to form a lens and the unit cells can be orientated to flow a beam through a defined path. In this sense, power flows in the direction of the unit cells, but phase is modified by the lens function. However, in an SVPC, the effects of the lens (i.e. focusing) are not manifested until the beam leaves the lattice. This modifies how waves are to be ray traced through an SVPC imaging system.

In a second embodiment, the transverse orientation of the unit cells in the SVPC described above are adjusted to control polarization. The operational principle here is the same as a wave plate. Birefringence introduced by asymmetry unit cells causes the two orthogonal directions for polarization to experience a different effective refractive index. This causes the two orthogonal polarizations to propagate at difference speeds, which gives the ability to control and convert polarization. The transverse orientation of the unit cells is maintained throughout the bending of the lattice to effectively form a wave plate throughout the volume of the lattice. This is in addition to the lensing and directional control already described herein.

Certain embodiments are directed to an SVPC having a lattice constructed from a plurality of unit cells, wherein the unit cells vary, as a function of position within the lattice, in a structural or material property comprising one or more of unit-cell periodicity, orientation in space, crystal symmetry, material composition, fill factor, or pattern within the unit cell. In a particular aspect, the SVL or SVPC is produced by the steps of: (a) constructing a first target K-function and calculating a first grating phase; (b) constructing a second K-function, the second K-function incorporating an (i) orientation bias, (ii) grating period bias, or (iii) grating critical region bias, and calculating a second grating phase; (c) repeating steps (a) and (b) until difference between successive grating phase calculation are sufficiently similar; (d) calculating an analog grating; (e) applying a threshold; and (f) synthesizing a spatially-variant photonic crystal having a configuration determined by steps (a)-(e). The SVPC can be configured to bend a light beam, alter its polarization, direct the flow of power, or change the phase profile of a beam. These attributes can be altered to filter light, bend light, split light, concentrate light, focus light, etc. In certain aspects, an SVPC has a beam bending efficiency of at least, at most, or about 70, 75, 80, 85, 90, 95, or 98%, including all values and ranges there between.

Certain embodiments are directed to an SVPC made from materials including photoresist, a chemically amplified resist, a chalcogenide, semiconductor, a network solid, a glass, a metal, an alloy, a liquid crystal, a liquid crystal polymer, a polymer composite, nanoparticles, or a nanoparticle composite. In certain aspects, the semiconductor is silicon, gallium arsenide, silicon nitride, or gallium nitride. In particular aspects, the material is a glassy or crystalline oxide, including but not limited to silica, titanium dioxide, zirconium oxide, and aluminum oxide. In certain aspects, the material within the volume of the SVL or SVPC that is not part of the lattice itself (the interstitial regions) can be vacuum, air, another gas (such as nitrogen), or another form of condensed matter, such as a pure liquid, a solution, a polymer, a chalcogenide, a semiconductor (such as silicon or gallium nitride), a network solid, an oxide glass, a metal, an alloy, a liquid crystal, a liquid crystal polymer, a polymer composite, nanoparticles, or a nanoparticle composite. In a further aspect, the oxide glass is silica or titanium dioxide. In certain aspects the lattice of the SVL or SVPC and the interstitial space have a contrast in the real part of the dielectric permittivity, |Re(εLattice)—Re(εInterstitial volume)|, which is 0.01, 0.05, 0.1, 0.5, 1, 5, 10, 50, 100, 500, 1000, 5000, to infinity, including all values there between. The electromagnetic radiation manipulated by the device or SVPC can have $\lambda_0 = 10^{-7}$ m (100 nm) to $10^{-2}$ m (10 mm). In certain aspects the electromagnetic radiation can have a plurality of wavelengths.

Some embodiments are directed to devices having an SVL or SVPC that is configured to flow electromagnetic radiation having $\lambda_0$ to a common location independent of angle and/or position of incidence. The SVL or SVPC has a lattice spacing that is 0.1, 0.3, 0.5, 0.7, 0.9, 1.1, 1.3, 5, to $10\lambda_0$, including all values and ranges there between. The SVPC can have any of the 14 Bravais lattice symmetries including cubic, tetragonal, orthorhombic, or hexagonal unit cells. In certain aspects, the lattice is configured to converge the electromagnetic radiation flowing through the SVL or SVPC to a collection or concentration region. The size of the collection or concentration region relative to the SVL or SVPC can range from 0.1%, 1%, 2%, 3%, 4%, 5%, 6%, 7%, 8%, 9%, 10%, 20%, 30%, 40%, or 50% of the volume of the SVL or SVPC, including all values and ranges there between, and can be located at any desired position within the SVL or SVPC.

Some embodiments are directed to an anti-reflective SVPC, having a lattice forming a plurality of unit cells, the lattice having two or three dimensions and forming at least one face, the at least one face having an array of protrusions that suppress scattering of an electromagnetic beam, e.g., a light beam, entering or leaving the lattice. In certain aspects 1, 2, 3, 4, 5 or 6 faces of the lattice have such protrusions. The lattice spacing of an anti-reflective SVPC can be 0.1, 0.3, 0.5, 0.7, 0.9, 1.1, 1.3, 5, to 104, including all values and ranges there between. In certain aspects, the electromagnetic radiation manipulated by the device can have $\lambda_0 = 10^{-7}$ m (100 nm) to $10^{-2}$ m (10 mm). The anti-reflective SVPC can have unit cells that are cubic, tetragonal, orthorhombic, or hexagonal unit cells. In certain aspects, the protrusions have a cross section that increases as the distance from the lattice face decreases. In particular embodiments, the protrusions are conical. The protrusion can have a length of $0.1\lambda_0$ to $2.0\lambda_0$, including all values and ranges there between. The protrusions can be configured and/or positioned to sculpt an external wave. The lattice can be made of at least one material selected from a polymer, a photoresist, a chemically amplified resist, a chalcogenide, semiconductor, a network solid, a glass, a metal, an alloy, a liquid crystal, a liquid crystal polymer, a polymer composite, nanoparticles, or a nanoparticle composite.

Certain embodiments are directed to a multiplexed SVPC for manipulating electromagnetic radiation in two or more ways. The multiplexed SVPC has a lattice of a plurality of unit cells wherein the unit cells vary as a function of position within the lattice in two or more structural or material properties for manipulation of the electromagnetic radiation in at least two ways. The structural or material properties can be determined by using methods described below. The structural or material properties include, but are not limited to two or more of unit-cell periodicity, orientation in space, symmetry, material composition, fill factor, and pattern within the unit cell. The multiplexed SVPC can be a filter, waveguide, lens, beam splitter, beam combiner, polarizer, or combinations thereof. The multiplexed SVPC can have a first function where the lattice bends electromagnetic radiation flowing through the region. The multiplexed SVL or SVPC can have a second function where the polarization is manipulated. The multiplexed SVL or SVPC can have a third function where the phase profile of a beam is modified. In certain aspects, a region of the multiplexed SVPC is configured to perform multiple functions. In a further aspect, the multiplexed SVPC can perform at least 3 functions in a single region, and the SVPC can be composed of multiple regions each having multiplexed functions. The lattice spacing of a multiplexed SVPC can be 0.1, 0.3, 0.5, 0.7, 0.9, 1.1, 1.3, 5, to $10\lambda_0$, including all values and ranges there between. In certain aspects, the electromagnetic radiation manipulated by the device can have $\lambda_0 = 10^{-7}$ m (100 nm) to $10^{-2}$ m ($10^0$ mm).

This disclosure summarizes an array of recent developments related to spatially-variant photonic crystals (SVPCs). SVPCs can be designed to provide extraordinary control of light and electromagnetic waves over very abrupt size scales using inexpensive materials with low refractive index. The inventors previously developed an algorithm to bend, twist, and otherwise spatially-vary periodic structures and used this algorithm to design a self-collimating photonic crystal to bend light through a tight 90° bend. These methods have been improved and are disclosed herein.

First, an anti-reflection structure was designed to minimize reflections at the edges of a lattice. This development has improved the efficiency of the devices incorporating SVPCs.

Second, it was discovered that multiple functions can be multiplexed into a single lattice. In particular, a lattice was developed that multiplex a lens and a 90 degree bend.

Third, a photon funnel was developed that is capable of concentrating light independent of polarization, position, or angle of incidence of an applied beam.

These developments can be utilized to provide more compact photonic systems, greatly relaxed alignment tolerances, energy harvesting, and the like.

Photonic crystals are composed of periodic dielectric, semiconductor, metallic, metallo-dielectric, or superconductor microstructures or nanostructures that affect electromagnetic wave propagation by defining allowed and forbidden bands.

Embodiments are directed to spatially-varying one or more attributes of a periodic structure such as photonic crystals. The methods described herein minimize deformations in the lattice in order to preserve the properties of the lattice. The methods can be used to spatially vary a self-collimating photonic crystal to control the flow of power. In certain aspects the variation in the lattice forms a bend or series of bends. In a particular aspect the lattice forms an electromagnetic funnel. In a further embodiment the methods can be used to spatially vary a band gap photonic crystal to form waveguide bends. A lattice described herein can be used for mitigating inter-modal coupling. The longitudinal orientation of unit cell controls direction of power flow, transverse orientation of unit cells control polarization, and gradients of other aspects of the unit cells (fill factor, spacing, etc.) control phase.

A spatially variant lattice can be configured to bend ER, focus ER, polarizes ER, or any combination thereof.

Certain embodiments are directed to methods for producing a spatially variant photonic crystal where the speed and efficiency is improved, comprising one or more of the following steps: (a) A 2D or 3D unit cell is decomposed by Fourier transform into a set of planar grating gratings, where each planar grating is defined by a grating vector and a complex amplitude. (b) The total set of planar gratings is reduced by dropping all planar gratings with magnitude of the complex amplitude below some threshold. A threshold value of below 2% of the largest complex amplitude is typical, but a smaller threshold may be needed to resolve more detail in the unit cells. (c) The total set of planar gratings is reduced by sorting them into sets where all planar gratings in a set have coplanar (i.e. parallel) grating vectors.

It is then only necessary to numerically solve for a single grating phase for each set because the grating phase for each member of set differs only by a constant. Alternatively one can perform steps (b) and (c) at the same time. In certain aspects the method is implemented in a single algorithm.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa.

The use of the word "a" or "an" when used in conjunction with the term "comprising" in the claims and/or the specification may mean "one," but it is also consistent with the meaning of "one or more," "at least one," and "one or more than one."

The term "about" or "approximately" are defined as being close to as understood by one of ordinary skill in the art. In one non-limiting embodiment the terms are defined to be within 10%, preferably within 5%, more preferably within 1%, and most preferably within 0.5%.

The term "substantially" and its variations are defined to include ranges within 10%, within 5%, within 1%, or within 0.5%.

The term "effective," as that term is used in the specification and/or claims, means adequate to accomplish a desired, expected, or intended result.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods of making and using the same of the present invention can "comprise," "consist essentially of," or "consist of" particular ingredients, components, blends, method steps, etc., disclosed throughout the specification. With respect to the transitional phase "consisting essentially of," in one non-limiting aspect, a basic and novel characteristic of the clarifying agent blends of the present invention are their ability to impart improved optical properties (e.g., improved clarity) to thermoplastic polyolefin compositions.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

(FIG. 2A) Physics describing self-collimation. Self-collimation occurs where isofrequency contours are sufficiently flat. (FIG. 2B) Simulation of a diverging beam incident on a self-collimating photonic crystal.

(FIG. 3A) Anti-reflection structures for two-dimensional lattices. (FIG. 3B) Anti-reflection structures for three-dimensional lattices.

(FIG. 16A) A top-view of the optical characterization set up, shown with the SEM image of a curved wavelength. (FIG. 16B) Beam-bending efficiency of curved wavelengths for two different radii fabricated using DLW in IP-DIP.

DETAILED DESCRIPTION OF THE INVENTION

Figure 1:
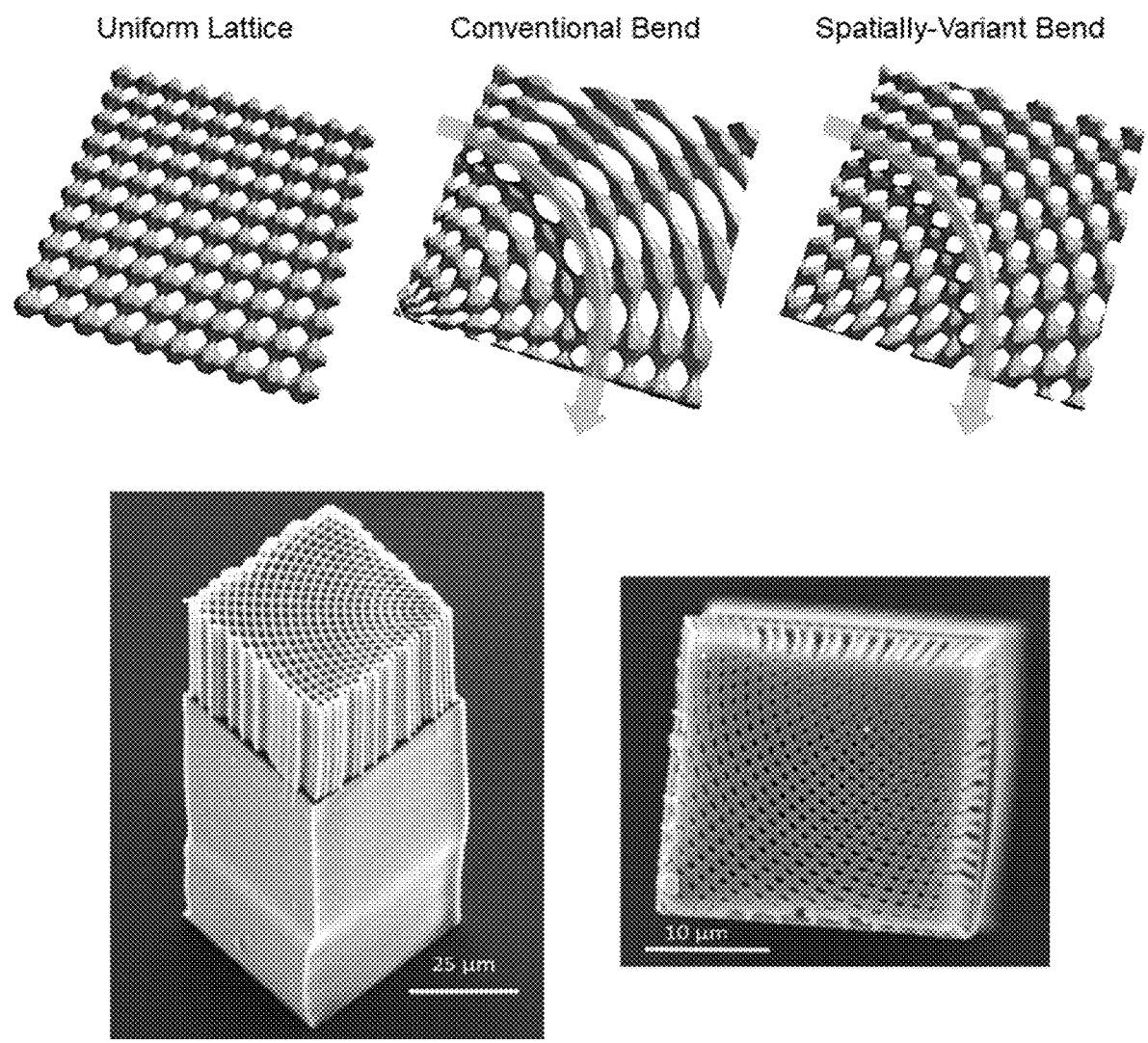
FIG. 1. Simple example of a spatially-variant lattice.
Figure 2A:
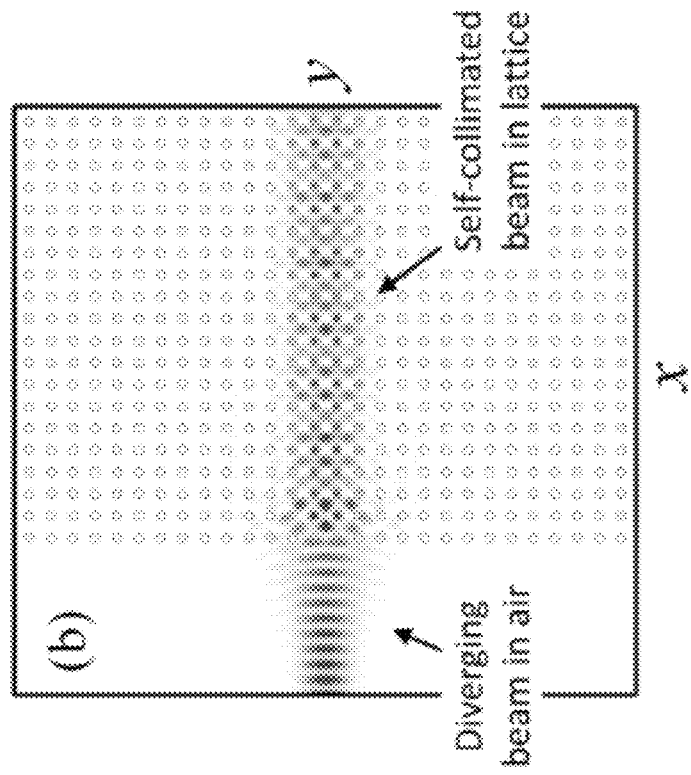
FIGS. 2A-2B.
Figure 2B:
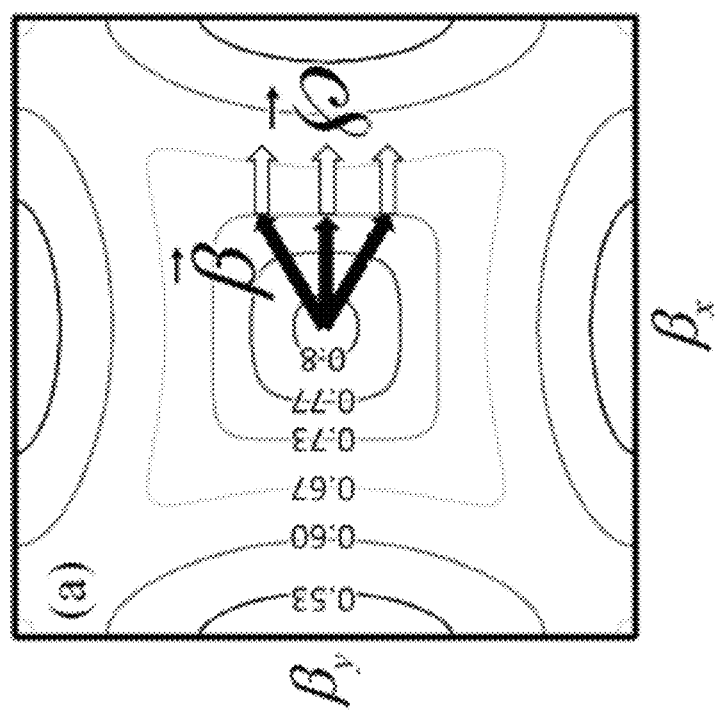

Efficient devices are needed for integrated photonics systems that can offer high data throughput as well as the ability to control optical beams in three dimensions. In the ideal condition this can be done by using waveguides, which can guide the light beams in a particular direction using total internal reflection (TIR). But in reality, to guide light using total internal reflection requires that the waveguide has a turn radius that is several hundred times greater than the vacuum wavelength, and the refractive index contrast must also be high to ensure minimum light leakage (Marcatili, 1969, *Bell System Technical Journal* 48(7):2103-32).

Electromagnetic fields cannot be controlled inside a single homogeneous material. Devices must contain gradients, curves, interfaces or other inhomogeneities that interact with the field to produce a response. In this regard, photonic crystals (Joannopoulos et al., 2011 *Photonic crystals: molding the flow of light*. Princeton, N.J.: Princeton University Press; Prather, 2009, Photonic crystals, theory, applications and fabrication, vol. 68. Hoboken, N.J.:John Wiley and Sons) and metamaterials (Sihvola, 2007, *Metamaterials* 1:2-11; Smith et al., 2004, *Science* 305:788-92), which are macroscopically homogeneous, are very limited in what they can be made to do. Transformation optics (TO) (Chen et al., 2010, *Nat. Mater.* 9:387-96; Kwon and Werner, 2010, *IEEE* 52:24-46; Pendry et al., 2006, *Science* 312:1780-82) has quickly become the dominant technique for designing periodic structures that are macroscopically inhomogeneous. The technique takes a spatial transform as the input, applies it to Maxwell's equations, pulls the transform out of the spatial coordinates and incorporates it into the constitutive parameters. The output of the technique is a map of permeability and permittivity as a function of position. The permeability and permittivity functions are typically tensor quantities containing extreme values that only metamaterials and/or photonic crystals are able to provide. In order to adjust the effective constitutive values throughout a lattice, it is necessary to spatially vary, or functionally grade, different attributes of the lattice, such as the structure within the unit cell, fill fraction, lattice spacing, orientation of the unit cells, material composition and even the symmetry of the lattice. Generating the geometry of spatially variant lattices is challenging because the electromagnetic properties of the lattice depend heavily on the size and shape of the unit cells and often require adjacent unit cells to be the same. This means that lattices must be twisted, bent and reshaped while keeping each unit cell consistent with the design. Further, this must be accomplished while keeping the lattice smooth, continuous, free of defects, and without significantly distorting the unit cells and without introducing unintended defects or their electromagnetic properties will be weakened or destroyed altogether. The ability to keep the geometry of the unit cells in a spatially variant lattice consistent with that of a uniform lattice is key to maintaining the same electromagnetic properties as the uniform lattice. To date, this type of spatial variance has only been accomplished in simple and canonical configurations. The vast majority of this work spatially varied only the fill fraction (Cassan et al., 2011, *J. Lightwave Technol.* 29:1937-43; Centeno and Cassagne, 2005, *Opt. Lett.* 30:2278-80; Centeno et al., 2006, *Phys. Rev. B* 73:235119; Do et al., 2012, *Opt. Express* 20:4776-83; Hakamata and Tsuda, 2004, *Proc. SPIE* 5360:411-18; Li et al., 2008, *Appl. Opt.* 47:C70-C74; Mehta et al., 2006, *Opt. Lett.* 31:2903-05; Roth et al., 2012, *Micromachines* 3:180-93; Rumpf et al., 2007, *Appl. Opt.* 46:5755-61; Srimathi et al., 2013, *Opt. Exp.* 21:18733-41; Srinivasan et al., 2009, *Opt. Exp.* 17:20365-75; Vasire and Gajire, 2011, *J. Appl. Phys.* 110:053103; Vasic et al., 2010, *Opt. Exp.* 18:20321-33; Wang and Chen, 2011, *J. Opt. Soc. Am. B* 28:2098-104) because this is the simplest to do from a mathematical perspective. Other work can be found that spatially varied the lattice spacing (Kurt et al., 2008, *Appl. Phys. Lett.* 93:171108; Sano and Kirihara, 2010, *Mater. Sci. Forum* 631-32:287-92), the orientation of the unit cells (Gaillot et al., 2008, *Opt. Express* 16:3986-92; Gao et al., 2008, *J. Opt. Soc. Am. A* 25:791-95; Mehta et al., 2007, *Opt. Lett.* 32:1935-37; Wang et al., 2012, In *Proc. 2012 IEEE Antennas and Propagation Society International Symposium (APSURSI)*, Chicago, Ill., 8-14 Jul. 2012, pp. 1-2. Piscataway, N.J.: IEEE), the pattern within the unit cell (Larouche et al., 2012, *Nat. Mater.* 11:450-54; Yu and Capasso, 2014, *Nat. Mater.* 13:139-150; Yu et al., 2013, *IEEE J. Sel. Top. Quantum Electron.* 19:4700423), the symmetry of the lattice (Lutkenhaus et al., 2014, *Appl. Opt.* 53:2548-55) and combinations of these (Lin et al., 2014, *Science* 345:298-302; Oner et al., 2013, *Opt. Lett.* 38:1688-90; Schurig et al., 2006, *Science* 314:977-80; Sun et al., 2014, *Opt. Commun.* 315: 367-73). The concept of spatially variant lattices applies equally well to metasurfaces and work can be found in the areas of leaky-wave antennas (Faenzi et al., 2014, *In Proc. 8th European Conf. on Antennas and Propagation (EuCAP)*, The Hague, The Netherlands, 1234-37, Piscataway, N.J.: IEEE), radiation and guiding (Farmahini-Farahani and Mosallaei, 2015, *IEEE Trans. Nanotechnol.* 14:75-81), phase gradient metasurfaces (Kildishev et al., 2013, *Science* 339:1232009; Meinzer et al., 2014, *Nat. Photonics* 8:889-98), Luneberg lenses (Bosiljevac et al., 2012, *Antennas Propag. IEEE Trans.* 60:4065-73; Wan et al., 2014, *Appl. Phys. Lett.* 104:151601; Wan et al., 2014, *Laser Photonics Rev.* 8:757-65) and more (Kildishev et al., 2013, *Science* 339:1232009; Meinzer et al., 2014, *Nat. Photonics* 8:889-98; Holloway et al., 2012, *Antennas Propag. Mag. IEEE* 54:10-35).

Periodic structures, or lattices, have proven to be one of the most enabling technologies of the 21st century. They provide for (i) making objects invisible, (ii) manipulating light and sound in way similar to manipulating electricity in computer chips, (iii) dramatically reducing size and weight of structures while maintaining their strength, and (iv) breaking longstanding paradigms in physics. A uniform lattice can be compared to a homogeneous medium, which has limited usefulness. To unlock the new physics, lattices must be made macroscopically inhomogeneous without also deforming the unit cells to an extent that negatively effects the optical properties. Bending, twisting, and otherwise spatially varying a periodic structure in this manner requires difficult to achieve geometries so it has only been accomplished in very limited configurations.

A. Spatially Variant Photonic Lattices

The inventors have developed a method for generating spatially-variant lattices (SVLs) with minimal deformation of the unit cells so that certain properties of the lattice are preserved. The algorithm is being applied to put periodic structures onto curves, exploit directional properties in new ways, generate spatially-variant photonic crystals (SVPCs), generate spatially-variant anisotropic metamaterials (SVAMs), and more.

The concept of a spatially-variant lattice is depicted in a simple example provided in FIG. 1. The sequence starts with a uniform lattice at the far left. Suppose it is desired to functionally grade the orientation of the unit cells so that the lattice is bent abruptly by 90°. The second diagram in this figure shows a functionally graded lattice generated using conventional approaches. The unit cells are severely deformed causing the lattice to lose its electromagnetic properties. This has prevented researchers from functionally grading lattices except in some limited and canonical configurations. The last lattice in this figure was generated with the EM Lab algorithm. While not perfect, the deformations have been strikingly minimized so that the electromagnetic properties are preserved.

Self-Collimation. Photonic crystals are periodic structures where the lattice spacing is on the order of a half-wavelength. Scattering in the lattice produces a complex configuration of interference that gives rise to powerful and useful phenomena like band gaps, dispersion, self-collimation, and more. Self-collimation is an effect where electromagnetic beams remain collimated regardless of the beam's divergence and the beams are forced to propagate along an axis of the lattice regardless of the beam's angle of incidence. The physics producing self-collimation can be understood through the isofrequency contours. Self-collimation occurs where the isocontours are flat and power is forced to propagate in a single direction. Many different unit cells produce self-collimation and it is often just a matter of determining the frequency and directions of self-collimation.

B. Design of Spatially Variant Photonic Crystals

Certain aspects of the invention utilize the algorithm described below to provide an improved SVPC and related devices. To date, the algorithm described by Rumpf and Pazos (2012, *Opt. Exp.* 20:15263-74) is the only general-purpose procedure presented in the literature for generating the physical geometry of spatially variant lattices. The methods described herein present new developments for generating better quality lattices and for generating them more efficiently. The method is presented here in the context of three-dimensional lattices, but the algorithm is equally well applied to two-dimensional lattices and metasurfaces. For example, in prior work, a guided-mode resonance filter was compensated to work on a curved surface by spatially varying the period of the grating (Rumpf et al., 2013, *Prog. Electromag. Res. C* 40:93-103). The ability to spatially vary unit cell orientation, spacing and pattern throughout a periodic structure enables many new design possibilities. In addition to being a necessary design step when using spatial transforms, the ability to generate high-quality spatially variant lattices enables entirely new design paradigms that cannot be conceived using spatial transforms. When the TO step is not used, the input to step 4 in must be constructed by other means. Often this entails constructing a map of the Poynting vector to direct the flow of waves along some path.

The new design paradigms include the following. First, spatially-variant self-collimating photonic crystals flow unguided beams around a 90-degree bend more abruptly than anything else reported in the literature while also using a much lower refractive index. Second, spatially-variant self-collimating photonic crystals can be configured as multi-mode waveguides in spatially variant band gap materials that guide waves around sharp bends without mixing power between the modes, thus maintaining the modal configuration in the waveguide.

C. Methods and Algorithms for Generating Spatially Variant Lattices

A periodic structure is formed any time the material properties are changed as a function of position and the changes repeat themselves in some manner. For electromagnetics, the material properties include the permeability, permittivity and/or conductivity. The following discussion treats only the permittivity, but the technique is easily extended to spatially vary any combination of the constitutive parameters. The standard algorithm for spatially varying periodic structures was first described in Rumpf and Pazos (*Opt. Exp.* 20:15263-74)). The algorithm is described briefly as well as several improvements that increase its efficiency and generate better quality lattices. The basic algorithm is described in two steps. First, the procedure for spatially varying planar gratings is described. Second, this procedure is then generalized to spatially vary arbitrary lattices. The methods and algorithm described herein can improve the control deformations, improve compensation for deformations, improve speed and efficiency by truncating the number of planar gratings, improve speed and efficiency by sorting the planar gratings into sets with coplanar grating vectors, or any combination thereof.

Basic algorithm to generate spatially variant planar gratings. The permittivity function $\varepsilon_a(r)$ for a planar grating is characterized by its complex amplitude a and its grating vector K according to equation (A1), where r is the position vector, $$\varepsilon_a(\vec{r}) = \mathrm{Re}\{a\exp(j\vec{K}\cdot\vec{r})\} \qquad (A1)$$

The grating vector conveys two pieces of information at the same time, the direction of the grating and its period. The grating vector is defined to be perpendicular to the grating planes and its magnitude is defined to be $2\pi$ divided by the spacing between adjacent planes.

If the period and/or direction of the grating is to be varied as a function of position, then the grating vector $K(r)$ becomes a function of position and describes the spatial variance of these two parameters at the same time. $K(r)$ is called the K-function of the spatially variant grating. The problem is that equation (A1) fails to construct the grating correctly when the grating vector is a function of position (Rumpf and Pazos, *Opt. Exp.* 20:15263-74). In order to do this correctly, an intermediate function called the grating phase $\phi(r)$ is introduced. The grating phase is related to the K-function through equation (A2).

$$\nabla\Phi(\vec{r}) = \vec{K}(\vec{r}) \qquad (A2)$$

To solve numerically for the grating phase, equation (A2) can be cast into matrix form using a numerical technique such as the finite-difference method (Rumpf and Pazos, *Opt. Exp.* 20:15263-74; Chopra and Canale, 2010, *Numerical methods for engineers*, New York, N.Y.: McGra-Hill Higher Education). In this equation, the grating phase is a single scalar quantity that attempts to control all three components of the K-function. There are not enough degrees of freedom to do this perfectly so the solution is a best fit and is calculated using a method such as least squares (Rumpf and Pazos, *Opt. Exp.* 20:15263-74; Chopra and Canale, 2010, *Numerical methods for engineers*, New York, N.Y.: McGra-Hill Higher Education). Given the grating phase, the permittivity is calculated directly from it using equation (A3).

$$\varepsilon_a(\vec{r}) = \mathrm{Re}\{a\,\exp[j\Phi(\vec{r})]\} \qquad (A3)$$

Equations (A2) and (A3) are used in place of equation (A1) to produce a smooth analog grating. However, the grating does not perfectly correspond to the original K-function. It is a best fit where the errors in the period and orientation of the grating are minimized with equal preference throughout the entire lattice.

In most cases, it is desired to generate binary gratings so that they can be made from a single material. The binary grating $\varepsilon_b(r)$ is calculated from the analog grating using a threshold function $\gamma(r)$ according to equation (A4).

$$\varepsilon_b(r) = \begin{cases} \varepsilon_1 & \varepsilon_a(r) \le \gamma(r) \\ \varepsilon_2 & \varepsilon_a(r) > \gamma(r) \end{cases} \quad (A4)$$

All points in the analog grating with values less than or equal to the threshold are assigned a new value of $\varepsilon_1$. All other points are assigned a value of $\varepsilon_2$. It is possible to generalize equation (A4) to use multiple threshold values in order to generate lattices containing more than two types of materials. Metallo-dielectric structures containing air, dielectric and metals can be generated this way. Making the threshold a function of position allows the fill fraction to be spatially varied throughout the lattice in addition to the direction and period of the grating. The fill fraction can be spatially varied exactly, so a best fit is not necessary for this parameter. The specific values for the threshold to realize a desired fill fraction can be calculated either numerically or analytically, but they are derived from the geometry of the unit cells. Given the desired fill fraction f(r) for $\varepsilon_2$, the threshold value for a sinusoidal grating can be estimated as equation (A5).

$$\gamma(\vec{r}) \cong \cos[\pi f(\vec{r})] \quad (A5)$$

Figure 18:
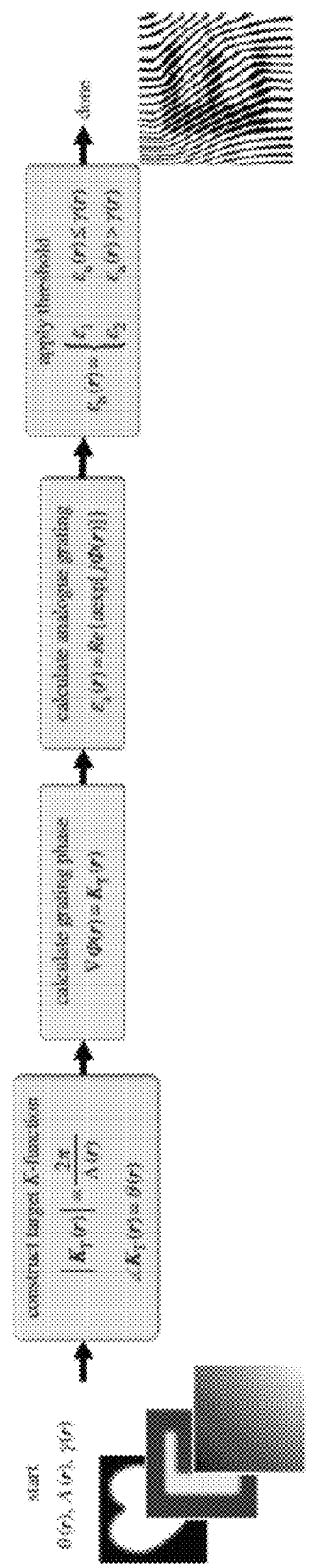
FIG. 18. Block diagram of an algorithm to spatially vary a planar grating.

A block diagram of the algorithm to spatially vary a planar grating is summarized in FIG. 18. The input to the algorithm is a map of the desired grating orientation $\theta(r)$, fill fracton f(r) and the grating period $\Lambda(r)$. From these, the target K-function $K_T(r)$ is calculated according to $$\vec{K}_T(r) = \frac{2\pi}{\Lambda(r)}(\hat{a}_x \cos[\theta(r)] + \hat{a}_y \sin[\theta(r)]) \quad (A6)$$

Next, the grating phase is calculated from the K-function by solving equation (A2). The analog grating is then calculated from the grating phase using equation (A3). The last step is to calculate the binary grating by applying the threshold function in equation (A4). The threshold function $\gamma(r)$ is determined from f(r). The precise relationship depends on the geometry of the unit cell. The output of the algorithm is a spatially variant grating that is the best compromise between grating orientation and grating period. No compromises are needed in spatially vary the fill fraction.

Modified algorithm to control deformations. The basic algorithm described above does an excellent job of incorporating all of the spatial variance while minimizing unintentional deformations to the grating. However, some deformations may still remain because the geometry was calculated from a best fit. When there exists additional design freedom, the quality of the lattice can be greatly improved. This freedom can be exploited to improve the orientation of the unit cells at the cost of the lattice spacing. It is also possible to improve the lattice spacing at the cost of the orientation. A grating generated by the basic algorithm was compared to two other gratings generated with modified algorithms. The grating generated by the basic algorithm possesses the best compromise between the orientation and the period of the grating. A grating generated with an algorithm modified to enforce only the orientation, the orientation of the grating is nearly perfect throughout, but the period varies considerably. A grating generated with an algorithm modified to enforce only the period is barely discernible and the orientation of the grating is slightly different from 45° within the heart region, but the period is nearly perfect throughout.

Figure 19:
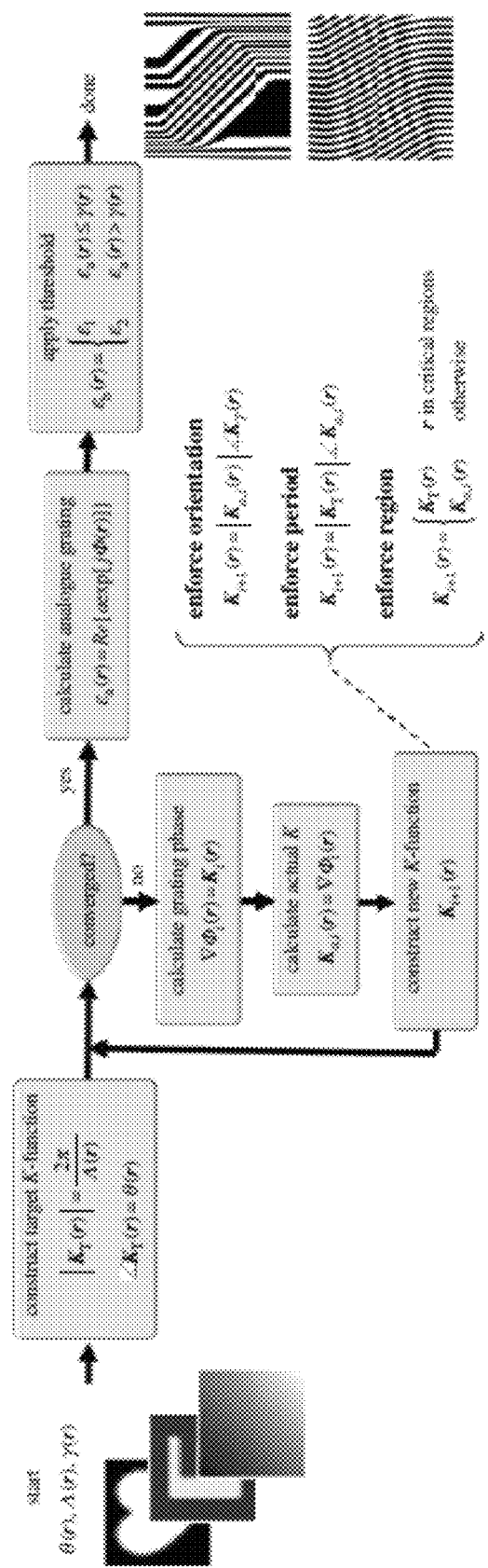
FIG. 19. Modification of basic algorithm to control deformations in spatially variant grating.

The manner in which the algorithm is modified to control deformations is summarized in FIG. 19. The modified algorithm begins by constructing the target K-function $K_T(r)$, which represents the perfect grating. This becomes the first K-function $K_i(r)$ for the iterative algorithm. The grating phase $\Phi_i(r)$ for the first iteration is calculated from $K_i(r)$ by solving equation (A2) as previously discussed. This calculation comes from a best fit so $\Phi_i(r)$ does not correspond to $K_i(r)$ exactly. The actual K-function that results is calculated from $\Phi_i(r)$ as $K_{a,i}(r)=\nabla\Phi_i(r)$. If $K_{a,i}(r)$ were used as the input for a second iteration, the grating phase from the second iteration would be the same as the first. Instead, the K-function for the next iteration $K_{i+1}(r)$ is constructed from some combination of $K_T(r)$ and $K_{a,i}(r)$, depending on what is being enforced. The three simplest approaches for combining these terms are described here. First, to enforce the orientation of the grating at the cost of the period, the new K-function is calculated according to $K_{i+1}(r)=|K_{a,i}(r)| \measuredangle K_T(r)$. This calculation retains the magnitude information from the previous iteration, but replaces the angle with the angle component of the target K-function. Second, to enforce the grating period at the cost of the orientation, the new K-function is calculated according to $K_{i+1}(r)=|K_T(r)| \measuredangle K_{a,i}(r)$. This retains the angle information from the previous iteration, but replaces the magnitude with the magnitude component of the target K-function. Third, to improve the quality of the grating in critical regions at the cost of the non-critical regions, $K_{i+1}(r)$ is set equal to $K_T(r)$ in the critical regions and set equal to $K_{a,i}(r)$ otherwise. After the new K-function is constructed, a new grating phase function is calculated and the process repeats. Iteration terminates when the change in the grating phase from one iteration to the next is sufficiently small. This change can be calculated according to equation (A7), where S is the volume or area of the lattice.

$$\Delta\Phi_{i+1} = \frac{1}{2\pi S}\int_S [\Phi_{i+1}(r) - \Phi_i(r)]ds \quad (A7)$$

In this work, iteration continued until $\Delta\Phi_{i-1}<2\times10^{-5}$. This can happened within 20-40 iterations, but the number can change depending on the size of the lattice and the complexity of the spatial variance. Hybrids of these three approaches are possible along with using weighted combinations of the target and actual K-functions.

Spatially varying arbitrary lattices. The permittivity of a periodic structure is a periodic function, so it can be expanded into a complex Fourier series as in equation (A8).

$$\varepsilon(r) = \Sigma_{p,q,r} a_{pqr} \exp(jK_{pqr} \cdot r) \quad (A8)$$

$$a_{pqr} = \text{FFT}[\varepsilon(r)] \quad (A9)$$

$$K_{pqr} = pT_1 + qT_2 + rT_3 \quad (A10)$$

Comparing equation (A8) with equation (A1), the term inside the summation has the form of a planar grating so it is concluded that a lattice can be decomposed into a set of planar gratings of the same physical size. The complex amplitudes of the planar gratings are calculated by Fourier trans forming the unit cell. Numerically, this can be done using a fast Fourier transform as indicated by equation (A9). The grating vectors for each planar grating are calculated analytically from the reciprocal lattice vectors $T_1$, $T_2$ and $T_3$ (Lax, 1974, *Symmetry principles in solid state and molecu-* lar physics, Mineola, N.Y., Courier Dover Publications) using equation (A10). The terms p, q and r are integers identifying the different planar gratings in the expansion. The algorithm runs faster when fewer planar gratings are retained, but the unit cells can be distorted depending on the severity of the truncation.

A second algorithm to spatially vary arbitrary lattices begins with the same input information, but now also includes a description of the unit cell. Greyscale unit cells are better than binary unit cells when the fill fraction is to be adjusted at the end. The first task in the algorithm is to decompose the unit cell in to its component planar gratings. This involves calculating the Fourier coefficients $a_{pqr}$ and the corresponding grating vectors $K_{pqr}(r)$. From here, it is most efficient to minimize the number of planar gratings that must be processed. One thing that can be done is to ignore all planar gratings with Fourier coefficients $a_{pqr}$ that are less than some small threshold. This usually achieves 60-90% reduction in the number of planar gratings without significantly distorting the unit cells. A second thing is to sort the remaining planar gratings into sets containing all parallel grating vectors. The grating phase for all other gratings in the set can be calculated immediately from this single solution using equation (A11).

$$\phi_m(r) + \alpha \phi_1(r), \text{ where } K_m = \alpha K_1 \tag{A11}$$

This second approach usually achieves a 70% reduction for two-dimensional lattices, and a 60% reduction for three-dimensional lattices. Using both together easily achieves a 90-99% overall reduction. Whatever planar gratings remain in the expansion are each spatially varied over the volume of the lattice as described previously. Deformation control is applied to each planar grating separately. The overall analog lattice is computed by summing all of the planar gratings according to equation (A12).

$$\varepsilon_\alpha(r) = \text{Re}\{\Sigma_{p,q,r} a_{pqr} \exp[j\phi_{pqr}(r)]\} \tag{A12}$$

The 'Re' operation in this equation extracts only the real part from the sum in order to remove small residual imaginary components that originate because the solution is obtained numerically.

The analog lattice can be analyzed to quantify any deformations to the lattice that may still exist. In many circumstances, it is possible to electromagnetically compensate for these stubborn deformations by spatially varying another property of the lattice. For example, when the lattice spacing is compressed, the fill fraction can be raised to increase the electrical size of the unit cells. When the lattice spacing is stretched, the fill fraction can be lowered to reduce the electrical size of the unit cells. The manner in which the fill fraction is adjusted to compensate must come from a rigorous electromagnetic simulation of the deformed unit cell. Given this map of desired fill fraction, the spatially variant threshold function is calculated. The final step in the process is to apply the threshold function to spatially vary the fill fraction.

Spatially varying arrays of discontinuous metallic elements. It is inefficient to decompose thin metallic elements into a set of planar gratings because many hundreds or thousands of planar gratings would be needed in the expansion in order to represent the elements accurately. Instead, it is possible to generate these lattices using just two or three planar gratings. For two-dimensional lattices and metasurfaces only two planar gratings are needed and these are spatially varied within the plane of the device. Metallic elements are placed at the intersections of the two planar gratings in an orientation defined by the planar gratings at the intersections. The specific geometry of the metallic elements at each point comes from the effective properties that they must realize at these points. The position and orientation of the metallic elements comes from the spatially variant planar gratings.

Periodic structures on curved surfaces. It is sometimes desired to put a periodic structure such as a metasurface onto a curved substrate. Such aplanatic designs are difficult to generate without deforming the lattice due to the curvature. Even when it is not desired to functionally grade the metasurface, the lattice must still be spatially varied in order to keep it uniform over the curved geometry. The algorithm for doing this is the same as discussed above except that the directions in which the derivatives are calculated must be modified to conform to the curvature. When this modification is incorporated, equation (A2) becomes (A13)

$$\Delta'\phi(r) = K(r) \tag{A13}$$

and $$\nabla' = \frac{\partial}{\partial a}\hat{a} + \frac{\partial}{\partial a}\hat{b} \tag{A14}$$

A simple way to solve equation (A13) is with the finite-difference method. Here, the x- and y-coordinates of the vertices are distributed evenly and it is only the z-coordinate that is changed to describe the surface height variations. More sophisticated meshing is certainly possible. The new directions that the derivatives are calculated are indicated by arrows superimposed onto the mesh. What used to be the x-direction in equation (A2) is now the $\hat{a}$ direction in equation (A13), and what used to be the y-direction is now the $\hat{b}$ direction. These new directions are chosen to conform to the curved surface and are always tangential to it. The derivatives in equation (A4) can be approximated with central finite-differences according to equation (A15), where $r_{p,q}$ is the physical position of the grid vertex identified by the array indices p and q, $$\frac{\partial}{\partial a}\Phi(r_{p,q}) \approx \frac{\Phi(r_{p+1,q}) - \Phi(r_{p-1,q})}{[r_{p+1,q} - r_{p-1,q}]} \text{ and} \tag{A15}$$

$$\frac{\partial}{\partial b}\Phi(r_{p,q}) \approx \frac{\Phi(r_{p,q+1}) - \Phi(r_{p,q-1})}{[r_{p,q+1} - r_{p,q-1}]}$$

The two K-functions needed to construct a hexagonal lattice are now defined to be in the $\hat{a}$ and $\hat{b}$ directions. If the lattice spacing is $\Lambda$, these are calculated according to equation (A16).

$$K_a(r) = \frac{2\pi}{\Lambda}\left[\hat{a}(r) - \frac{1}{\sqrt{3}}\hat{b}(r)\right] \text{ and } K_b(r) = \frac{2\pi}{\Lambda}\left[\hat{a}(r) - \frac{1}{\sqrt{3}}\hat{b}(r)\right] \tag{A16}$$

The remainder of the algorithm is the same including deformation control, placing discreet metal elements, and spatially varying arbitrary lattices. The last step for a metasurface is to place metal elements at the intersections of the gratings. In this case, the elements are metal rings and they are oriented to be parallel to the surface.

D. Antireflection Structures for Photonic Crystals

A significant problem with photonic crystal devices is preventing reflections and scattering at the edges of the device. The problem is more complicated than a simple anti-reflection coating like on a camera lens. The waves inside the photonic crystal are Bloch waves and have a different amplitude profile than the mostly uniform waves outside of the photonic crystal.

Figure 3A:
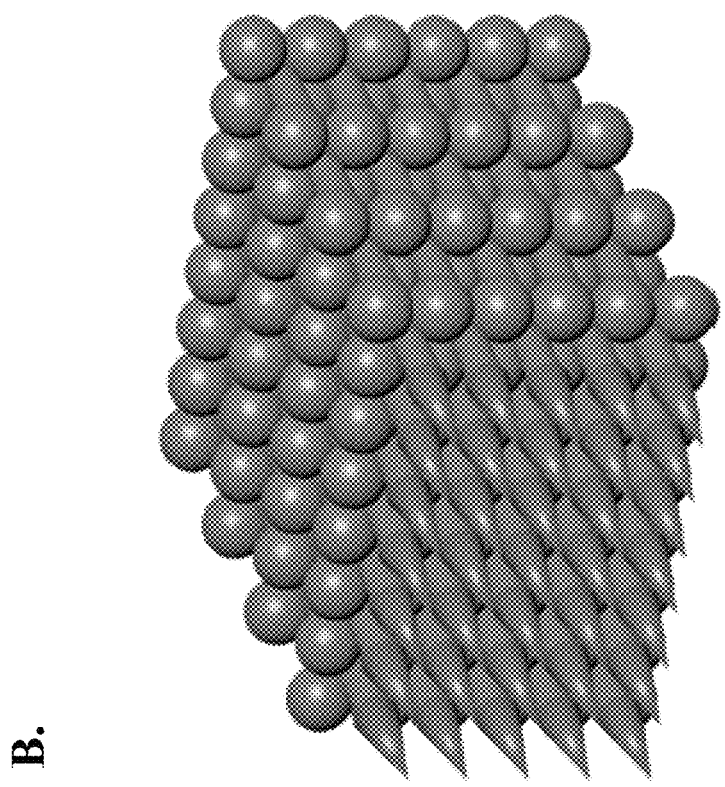
FIGS. 3A-3B.
Figure 3B:
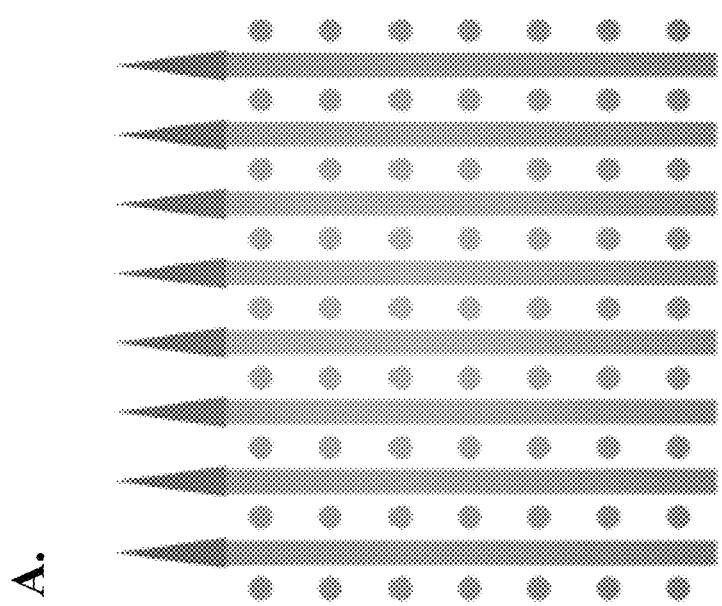
Figure 4:
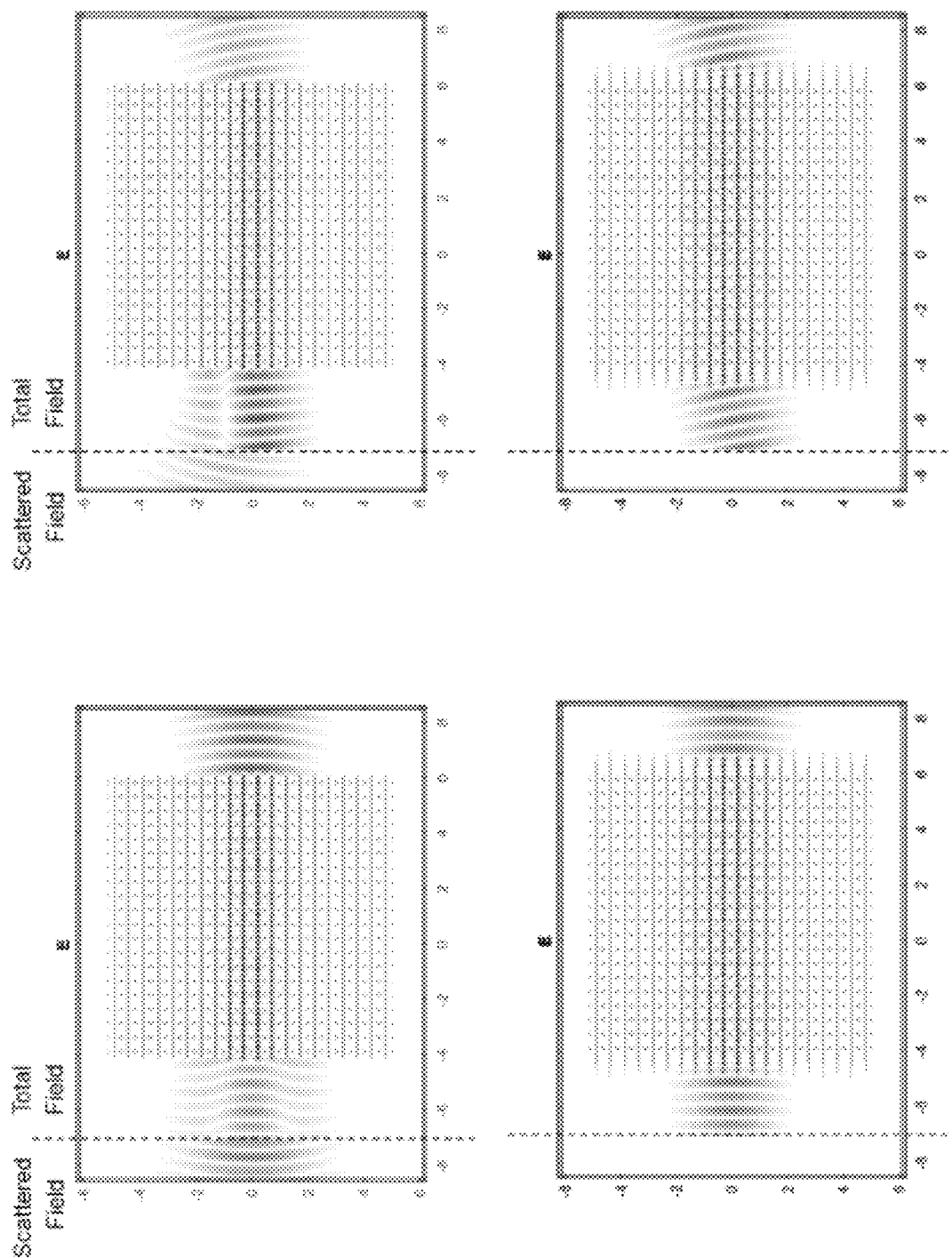
FIG. 4. (Top) Two simulations without anti-reflection structures. Scattering is severe. (Bottom) Same simulations with anti-reflection structures. Scattering significantly reduced.

To suppress reflections and scattering, the inventors have developed an algorithm to optimize the size, shape, and position of cone-shaped structures located at the edge of the lattice. One embodiment is shown in FIG. 3 for both 2D and 3D structures. The invention includes embodiments that transition the surface of the device spatially from the dielectric properties of the surrounding medium to that of the basis of the unit cells. The cones, which provide a transition from air to the rods of the structures shown, are but one possible embodiment of the invention, which is simple but effective. Others could include embodiments in which cones are replaced by paraboloids of revolution, or other structures for which the cross-section of material increases non-linearly and in a manner which maximizes coupling of light into the device.

E. Self-Collimating Bends

Using the algorithm described herein to bend self-collimating photonic crystals, light can be made to flow along arbitrary paths. In fact, recent research has shown that spatially-variant photonic crystals (SVPCs) can exhibit very strong and abrupt control of electromagnetic waves even when the lattices are made from materials with low refractive index.

Figure 5:
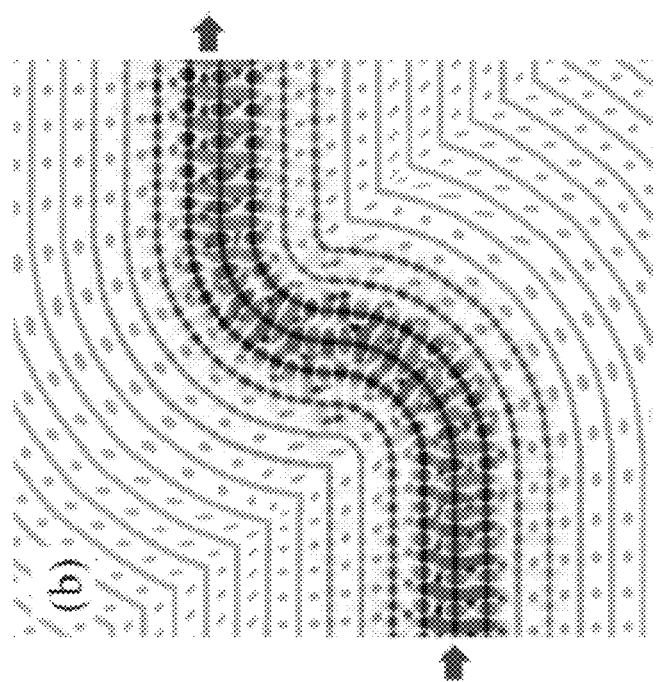
FIG. 5. (Left) Experimental results for a photonic scale SVPC with bend radius $6.7\lambda_0$. (Right) Simulation of a 2D SVPC with a tight double bend.
Figure 5:
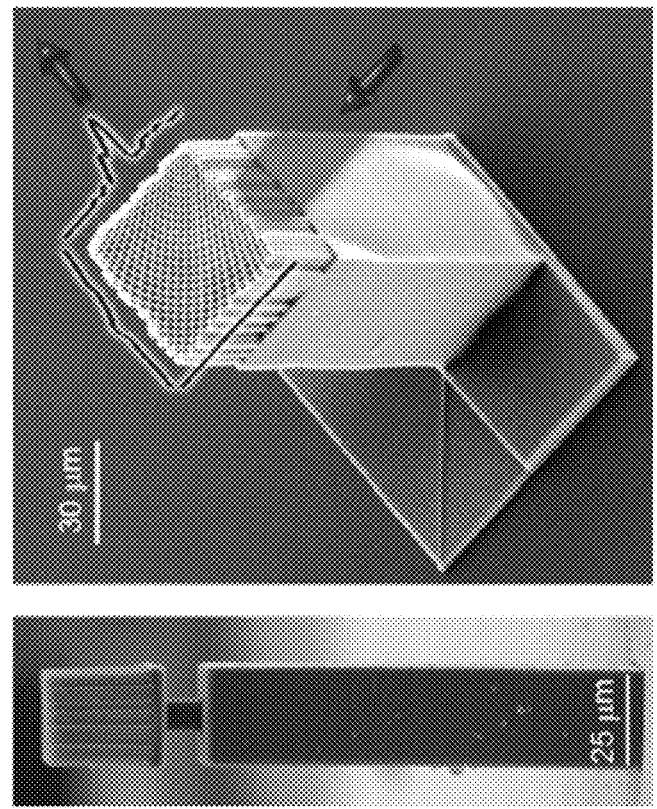

FIG. 5 (left) shows two SVPCs fabricated by multiphoton lithography (MPL). The blue ribbons show the measured transmission through the lattice as a function of position around the perimeter of the lattice. FIG. 5 (right) shows a simulation of a lattice with a double bend to show that electromagnetic waves can be made to flow over arbitrary paths.

Figure 6:
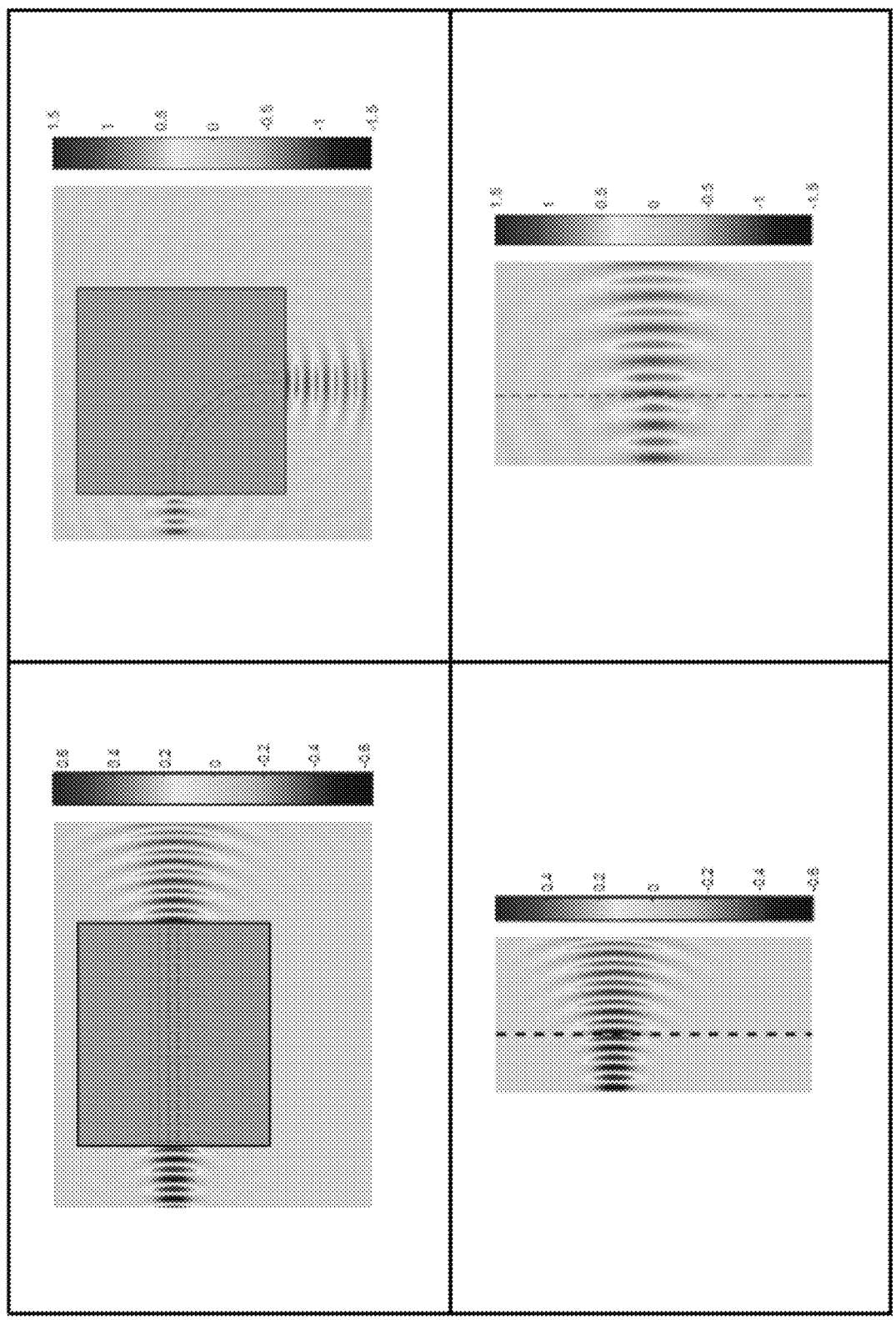
FIG. 6. Conservation of etendue through two SVPCs. (Left column) Straight lattice. (Right column) SVPC bend.
Figure 7:
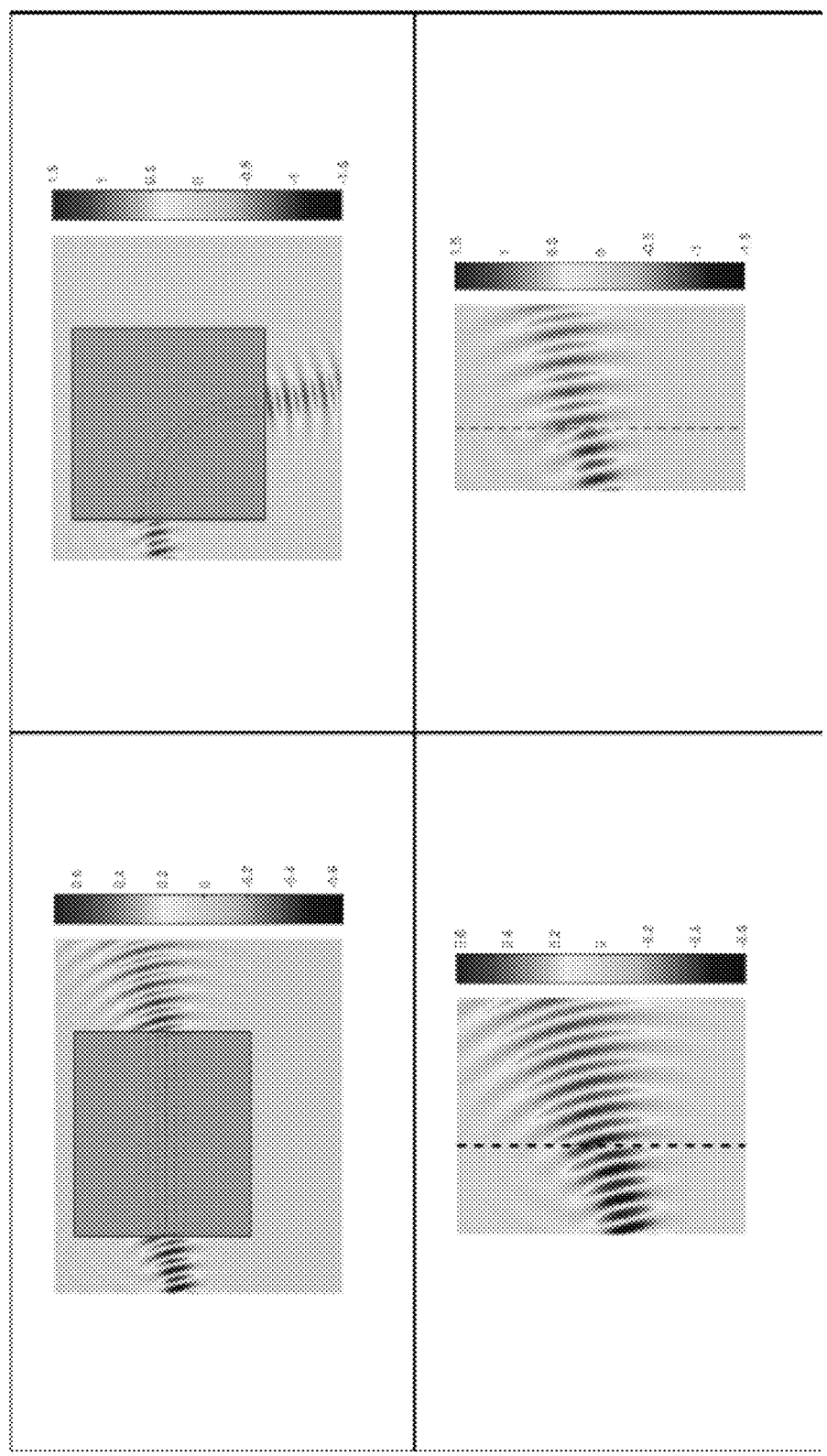
FIG. 7. Conservation of etendue through two SVPCs with beam incident at an angle. (Left column) Straight lattice. (Right column) SVPC bend.

An interesting aspect of SVPCs is that the ones based on self-collimation seem to conserve etendue. Etendue characterizes the width of the beam and its angular divergence. Two lattices shown in FIG. 6 and FIG. 7 were simulated to illustrated this point. The only difference between these figures is the angle of incidence of the input beam. The left columns show the results from a straight lattice. The upper left diagrams show the overall simulation. The bottom left diagrams show the output beam butted up against the input beam to illustrate etendue. This same thing is illustrated in the right hand columns, but for a bent SVPC. Here the output beams are also rotated to match to the input beams. In both of these cases, etendue is preserved.

Figure 8:
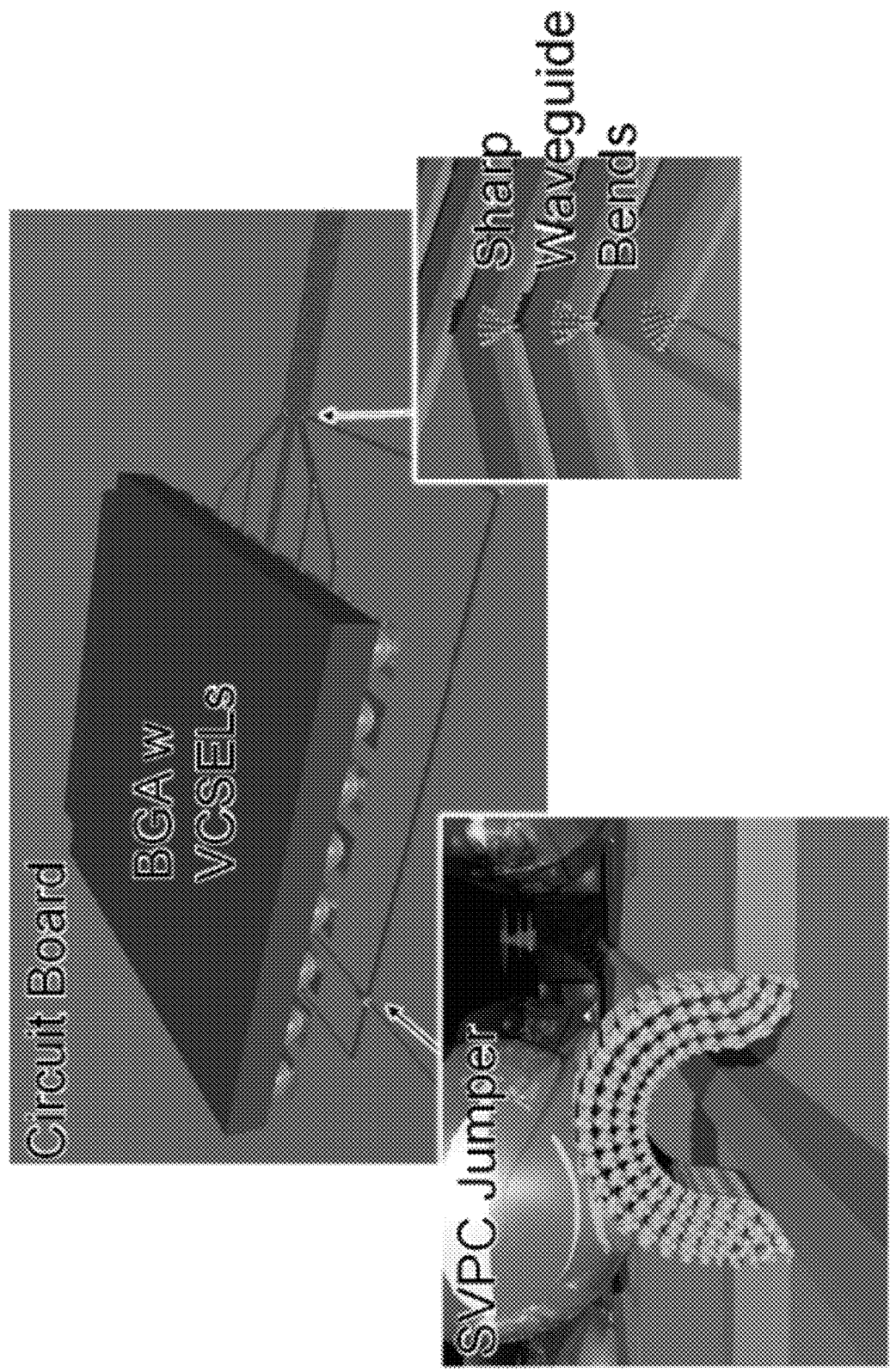
FIG. 8. SVPCs for optical interconnects.

Two additional applications of SVPC bends are illustrated in FIG. 8. One vision is to connect semiconductor chips by light instead of electricity in order to accommodate faster signals and more bandwidth. A problem arises when two waveguides need to be crossed. "Optical jumpers" can be formed to do this purpose as depicted at the lower left. The invention includes devices in which beams are flowed through turns with arbitrary angles, including out-of-plane turns that direct light into the third dimension.

While counterintuitive, the SVPC-based devices of this invention can be more practical to make that other conventional beam-redirecting devices, such as mirrors, because they can be prepared in a single scanned-beam photolithography step. In contrast, creating other beam-redirecting devices requires complex multi-step processes, which still do not necessarily provide a route to all beam-redirecting geometries that may be needed, particularly when considering applications involving 3D interconnects. For example, creating a mirror involves fabrication of a surface having sub-wavelength smoothness, followed by deposition of a metal onto the supporting surface. Fabricating dielectric mirrors is even more complex, as this requires depositing two or more materials into multiple layers, each at a highly-precise sub-wavelength thickness. Methods for depositing these materials are optimized for deposition onto a flat surface, whereas beam steering devices require that the surface is not parallel to a supporting substrate. Fabricate-and-release approaches, as are used to create MEMS devices are complex and cannot necessarily provide a route to mirrored surfaces having any desired orientation.

Applications can include, but are not limited to optical jumpers, sharp waveguide bends, reserving etendue around bends (imaging around bends), directing light out-of-plane into the third dimension, and 3D optical interconnects that can couple light and corresponding optically-encoded signal beams between an electronic plane to an optical backplane.

F. Photon Funnel

Figure 9:
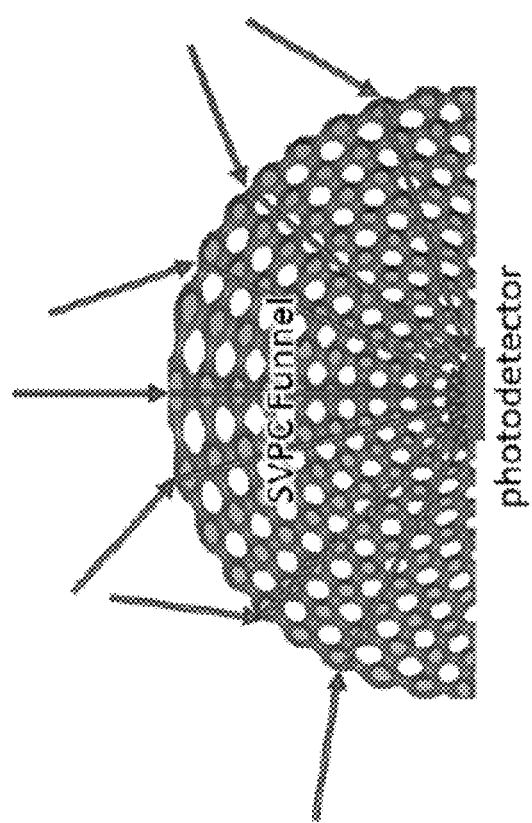
FIG. 9. (Left) Concentrating light with a lens. (Right) Concentrating light with a funnel.
Figure 9:
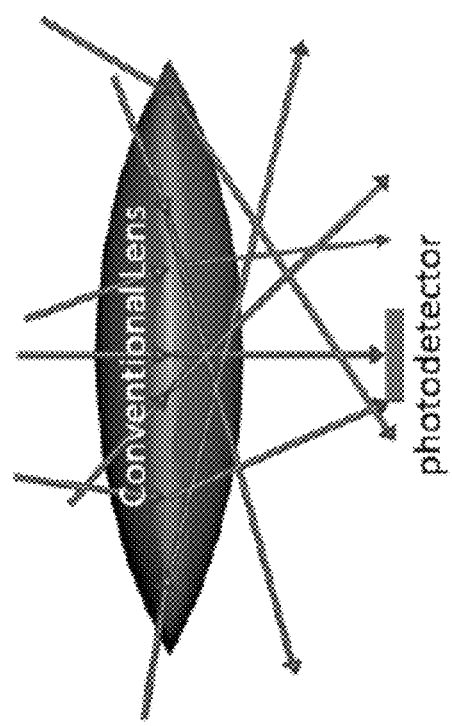

There are many times in photonics where it is desired to concentrate light to a common point or region. This can be to collect light for energy harvesting, sensing, or flowing light into a waveguide. The conventional approach is to use a lens; however, if the light is incident at a different position or angle of incidence, the light is no longer flowed to the same point. A photon funnel (PF) is based on SVPCs that are spatially varied in a manner that flows light to a common point independent of the angle of incidence or position of incidence of the light. All of this is illustrated in FIG. 9.

Figure 10:
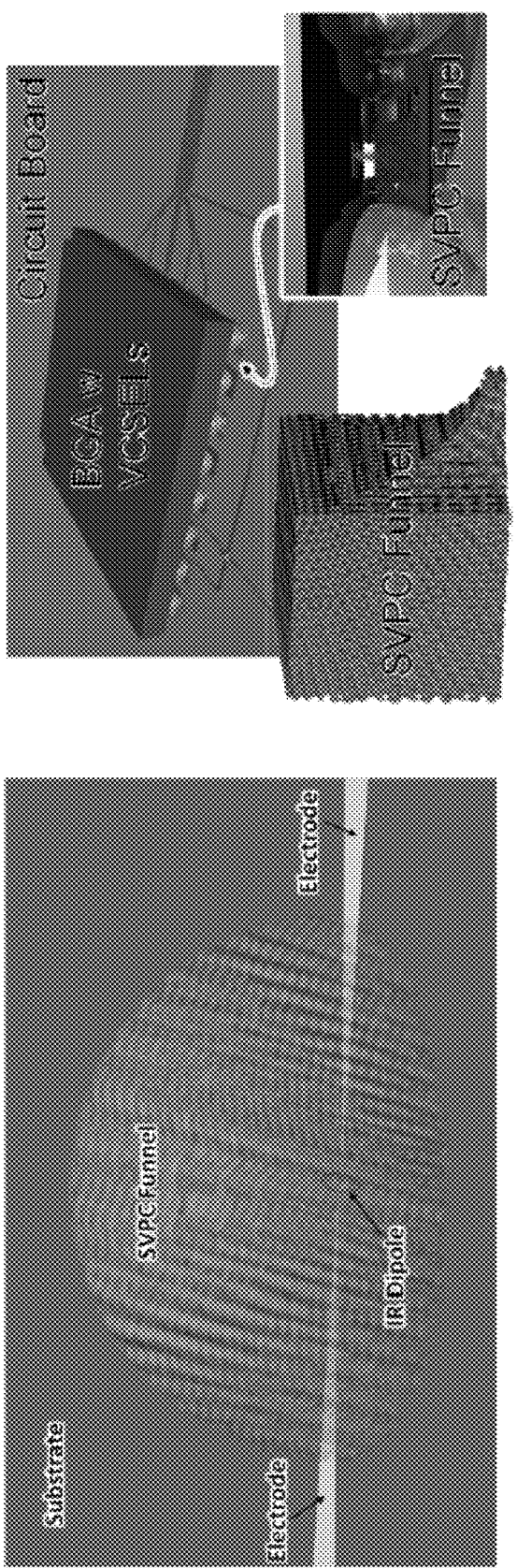
FIG. 10. (Left) Photon funnel used for detection. (Right) Photon funnel used to couple light from chip to waveguide.

Two device concepts for the photon funnel are illustrated in FIG. 10. The leftmost diagram shows a photon funnel placed atop an infrared antenna to enhance the detection efficiency of the device. The rightmost diagram shows a photon funnel being used to relax the alignment tolerance in order to more efficiently couple light from a chip into an optical waveguide.

Photon funnels can be used for concentrating light for sensors, concentrating light onto pixels of an imaging array (e.g., CCD), relaxing alignment tolerances for coupling into waveguides, energy harvesting, and coupling light from compact sources, such as vertical-cavity surface emitting lasers (VCSELs), into waveguides, optical fibers, or other devices with tight alignment tolerance and disparate input aperture from the source.

G. Multiplexed Elements

Figure 11:
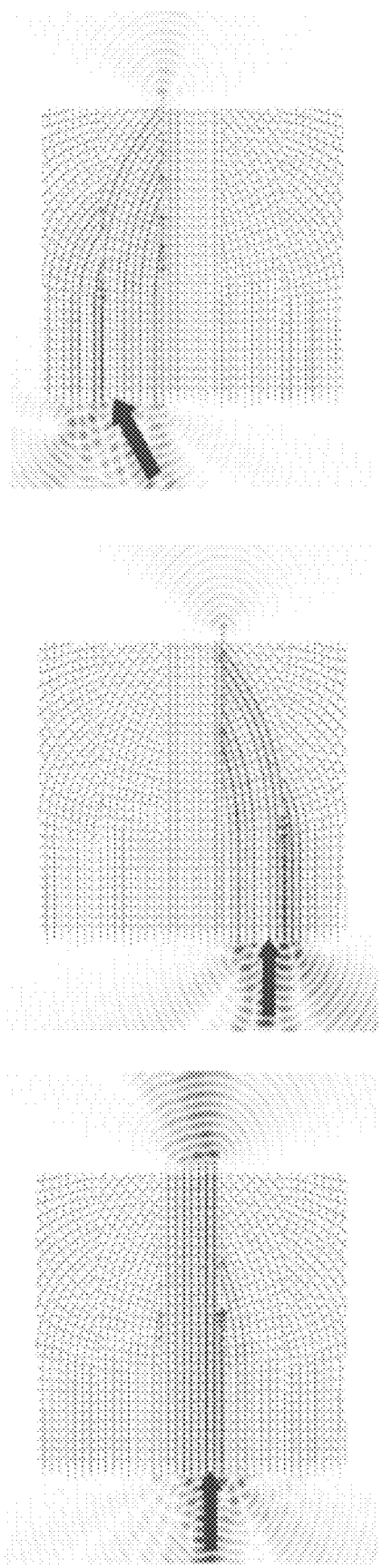
FIG. 11. Concept simulations of a photon funnel.

Given the ability to spatially vary multiple properties at the same time, it becomes possible to combine multiple physics at the same time. While there exist many embodiments, one example is shown in FIG. 11 where a lens is multiplexed into the same lattice with a bend. The beam both flows around the bend and focuses due to the lens. The physics producing both functions have been combined into the same volume of space suggesting applications for making photonic systems more compact. Other functions that could be multiplexed include filters, beam steering, lenses, compound lenses, multiplexers, beam splitters/combiners, polarizers, and more.

Figure 12:
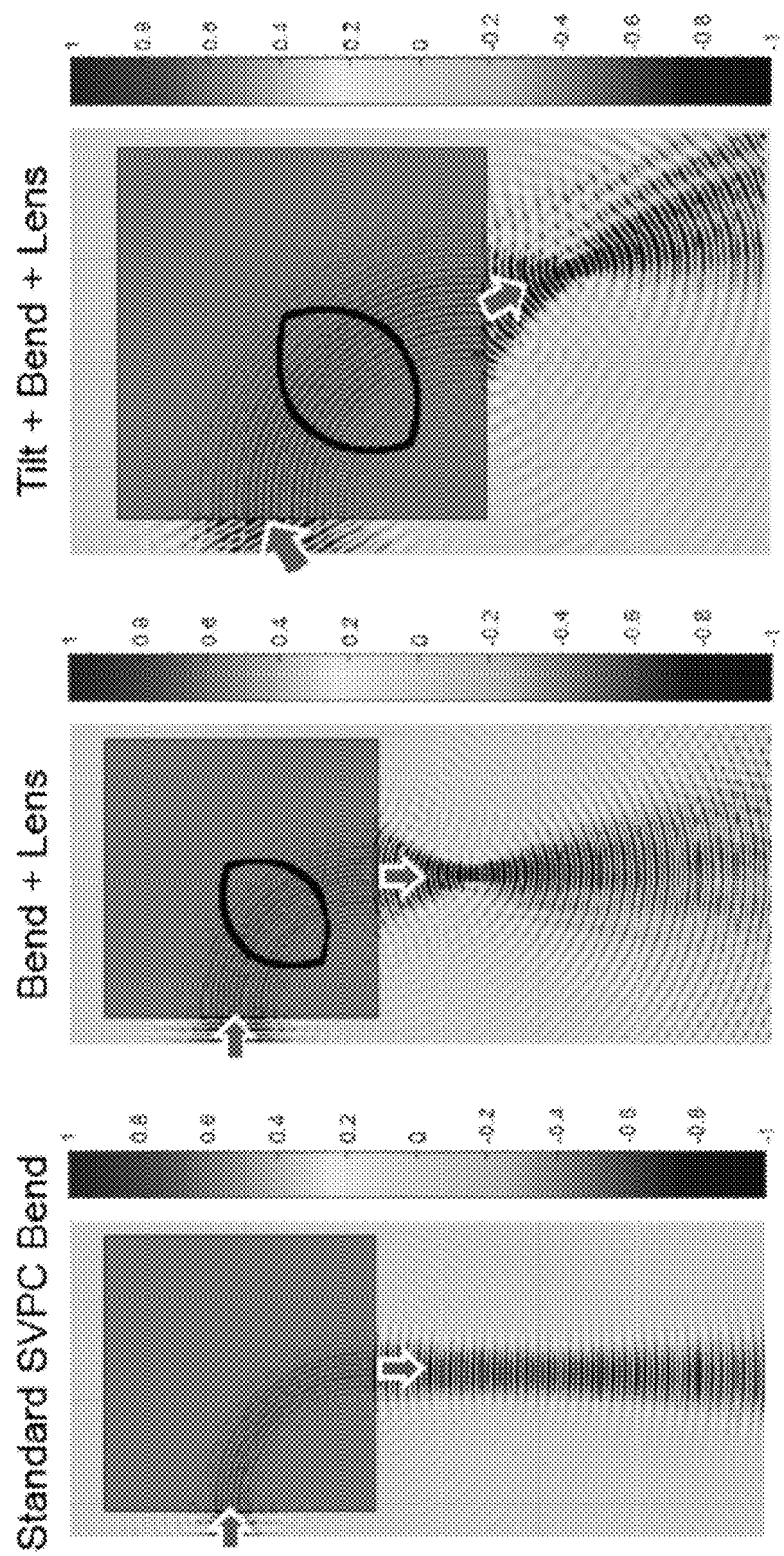
FIG. 12. (Left) Standard SVPC bend. (Middle) SVPC bend with a lens multiplexed into the lattice. (Right) Same multiplexed device, but with the source beam incident at an angle.

In fact, it is possible to multiplex a third function into the lattice discussed above. A single layer from a lattice with three simultaneous functions is shown in FIG. 12. First, a uniform lattice is shown first. Second, a bend is then incorporated by functionally grading the orientation of the unit cells. Third, a lens function is incorporated by functionally grading the fill factor to form the lens. In some lattices this may detune the self-collimation effect which is compensated by simultaneously functionally grading the lattice spacing or some other attribute. Last, polarization rotation is incorporated by spatially varying the rotation of the unit cells along the path of the beam. It is very difficult to examine the lattice and see that all of this has happened. An animation is ideal to see this.

Figure 13:
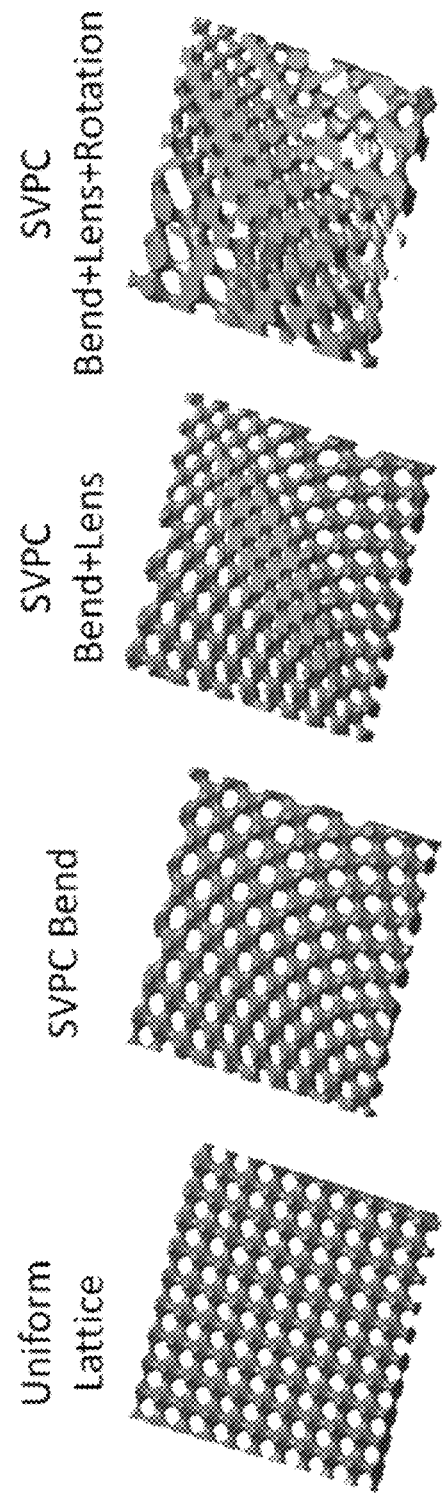
FIG. 13. SVPC with three multiplexed functions: Uniform lattice, SVPC bend, a lens function has been incorporated by increasing fill factor and decreasing lattice spacing; and the orientation of the unit cells is rotated 180° around the bend to control polarization.
Figure 14:
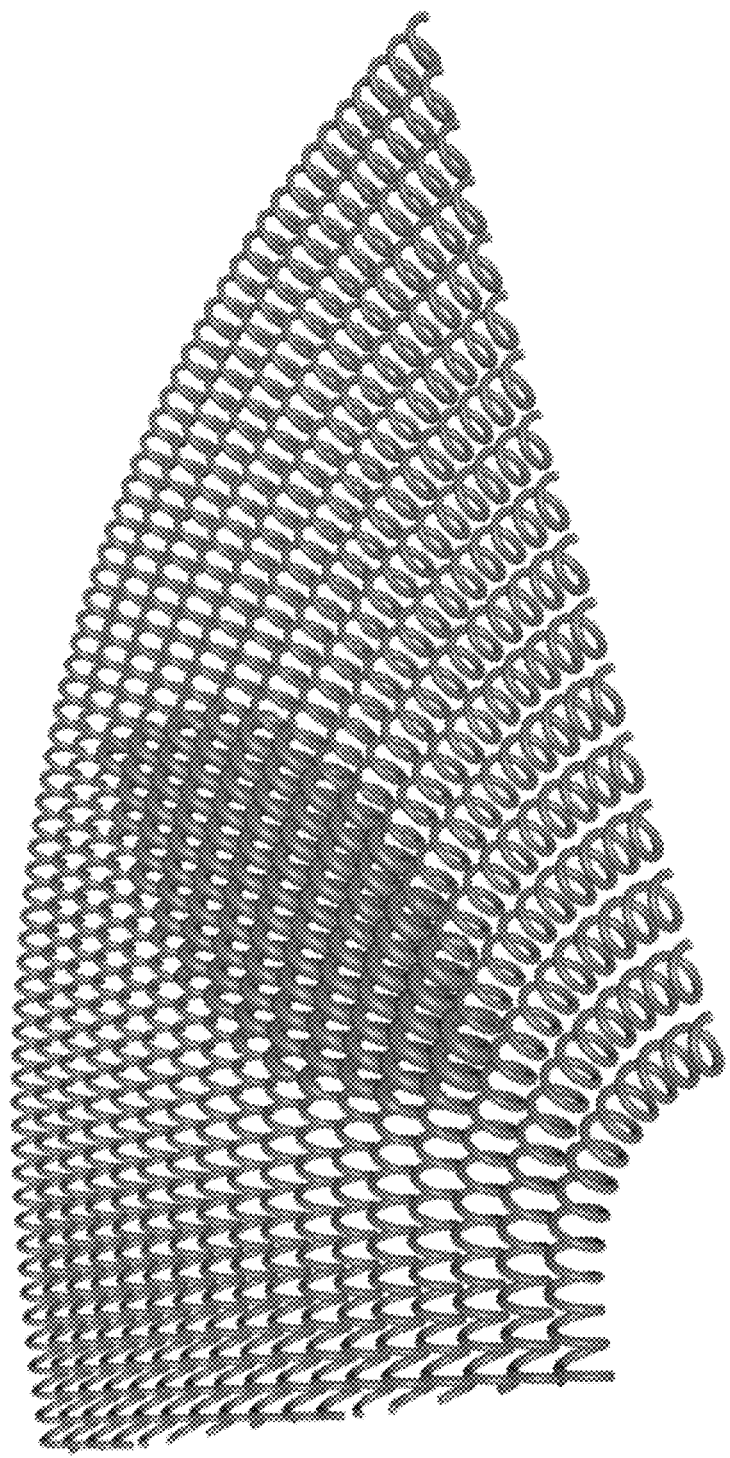
FIG. 14. Alternative view of SVPC with three multiplexed functions.
Figure 15:
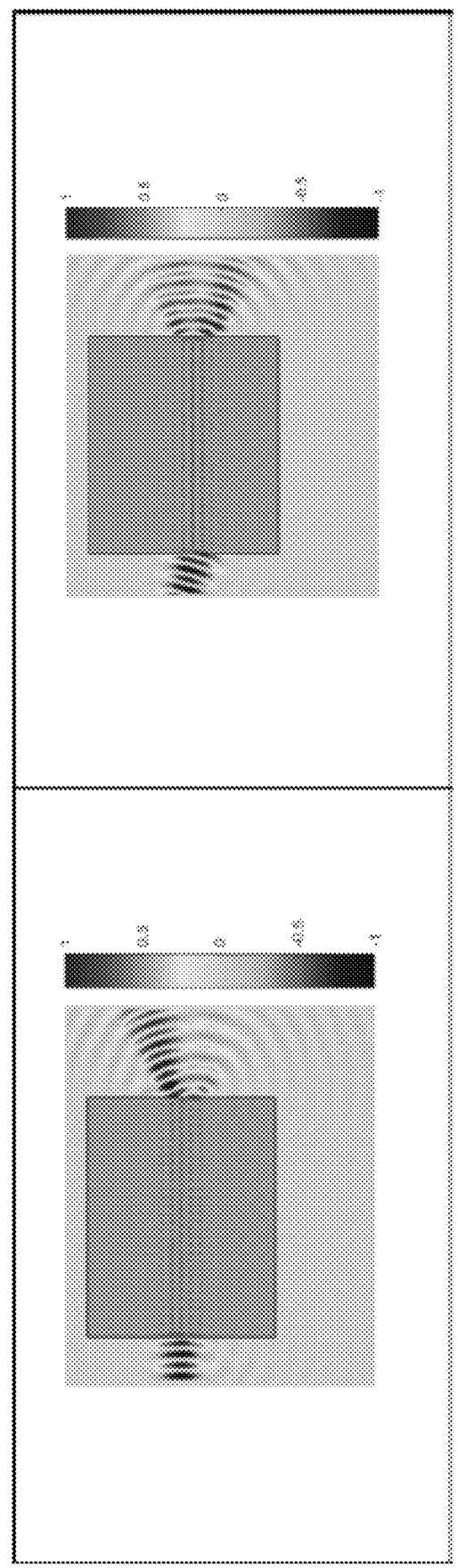
FIG. 15. Simplest lattices that control power and phase independently using a chirped fill factor. (Left) Beam at normal incidence. (right) Beam at 18° angle of incidence.

An alternate view of a similarly functioning lattice is shown in FIG. 13. Here a chiral unit cell produces both self-collimation and a circularly polarized eigen-state that rotates linearly polarized waves. In addition, the fill factor is adjusted to form a lens. This lattice will simultaneously control power through the orientation of the unit cells, rotate polarization through its chirality, and control phase through fill factor (and possibly lattice spacing). It is straightforward to envision even more functions being combined into the same lattice.

Compact imaging systems, Compound lenses, Lenses and imaging systems with reduced aberrations, Controlling polarization through an imaging system, and combining multiple physics

H. Independent Control of Power and Phase

SVPCs provide the unique ability to control power and phase independently and within the same volume of space. The simulations shown in FIG. 11 is one example. The direction of the beam is controlled through the orientation of the unit cells while phase is controlled through other properties such as fill factor, pattern within the unit cell, lattice spacing, or a combination of these. While this is a new concept in electromagnetics, it suggests applications in imaging, encryption, making devices more compact, and device concepts that have not been possible until right now.

The inventors have observed for certain SVPCs that the beam-bending efficiency changes with the intensity of the beam flowing through the device. At high input intensities, the beam bending is efficient. At low input intensities, the beam bending is low in efficiency. In essence, the device is displaying the capacity to switch its optical performance as a function of the input intensity. This provides evidence that active- and passively-switchable SVPC devices could be created in which light intensity and low-frequency DC or AC electric fields are used to switch the performance of a device. In other embodiments, active devices or special materials may be incorporated to enhance the switchability and tenability of the device.

The present invention includes, but is not limited to, the following embodiments. In what follows, "low" and "high" refers to the relative intensity of light at the input and output of an SVPC device, and these might be used to encode, transmit, and process binary information on an optical signal.

SVPC NOT gate. An SVPC NOT gate is an embodiment of the invention in which an SVPC and its constituent materials are selected and designed so that the output from the device along a certain beam-flow path is low when the input to the device is high. The device could consist of a Signal-Input port and Output-1 and Output-2. A low signal at Signal-Input would transmit to Output-1 and a high signal at Signal-Input would transmit to Output-2.

SVPC Two port optical switch. An SVPC two-port optical switch is an embodiment of the invention in which an SVPC and its constituent materials are selected and designed so that the device functions like the optical equivalent of a transistor. In one possible embodiment, the device has the following ports: Signal-Input, Gate-Input, Output-1 and Output-2. A high (or low) intensity beam at the Gate-Input would cause the Signal to flow to Output-1 (or 2).

SVPC AND/NAND gate. An SVPC AND/NAND-gate is an embodiment of the invention in which an SVPC and its constituent materials are selected and designed so that the device functions like the optical equivalent of an AND gate and a NAND gate. The device would have the following ports: Input-1, Input-2, Output-1, and Output-2. The signal output from Output-1 would only be high only if both inputs at Input-1 and Input-2 are high. The signal at Output-1 would otherwise be low. Output-1 then behaves like an AND gate. Output-2 could be the complement of Output-1, so it functions like a NAND gate.

SVPC logic-devices. Sequences of SVPC AND/NAND gates and NOT gates could be connected in series and parallel to create optical binary logic circuits.

I. Light Disperser

A light disperser is an embodiment of the invention in which an SVPC-based Photon Funnel is used to disperse light rather than concentrate it. Given the electromagnetic property of reciprocity, light emanating from a divergent light source placed at the "focus" of a Photon Funnel would be spread out through the funnel to exit from the opposite face, dispersed across the surface. This type of device could be used to disperse light from a compact source, with applications in imaging, illumination, microscopy, and endoscopy.

EXAMPLES

The following examples as well as the figures are included to demonstrate preferred embodiments of the invention. It should be appreciated by those of skill in the art that the techniques disclosed in the examples or figures represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Bending Radius and Efficiency of Waveguides

This example describes the fabrication of micron-scale spatially variant photonic crystals (SVPCs) and their use for steering light beams through turns with bending radius $R_{bend}$ on the order of ten times the optical wavelength $\lambda_0$. Devices based on conventional photonic crystals, metamaterials, plasmonics, and transformation optics have all been explored for controlling light beams and steering them through tight turns. These devices offer promise for photonic interconnects, but they are based on exotic materials, including metals, that make them impractically lossy (referring to the dissipation of electrical or electromagnetic energy) or difficult to fabricate. Waveguides can also be used to steer light using total internal reflection; however, $R_{bend}$ of a waveguide must be hundreds of times $\lambda_0$ to guide light efficiently, which limits their use in optical circuits. SVPCs were fabricated by multi-photon lithography using the commercially available photo-polymer IP-DIP. The SVPCs were structurally and optically characterized and found to be capable of bending light having $\lambda_0$=1.55 µm through a 90-degree turn with $R_{bend}$=10 µM. Curved waveguides with $R_{bend}$=15 µm and 35 µm were also fabricated using IP-DIP and optically characterized. The SVPCs were able to steer the light beams through tighter turns than either waveguide and with higher efficiency.

A. Experimental

SU-2075, a photo-polymer from Microchem, was spin coated on a standard glass slide for the fabrication of IP-Dip (Nanoscribe) SVPCs using MPL. An adhesion layer was spin coated onto a 19 mm×19 mm glass slide using 52% diluted SU-8 layer in diluted cyclopentanone (CAS 120-92-3). A 5 µm thick adhesion layer of SU-8 was formed by spin coating the diluted SU-8 onto the substrate (6000 rpm, 30 s), prebaking the sample on a hot plate (65° C. for 1 min and 95° C. for 6 min), exposing to UV light for 2 min (Loctite ZETA 741 1-5, 400 W metal halide source. 315 nm-400 nm), post baking (65° C. for 1 min and 95° C. for 9 min), and allowing to cool to room temperature. The SU-8 coated glass slide was fixed to a sample holder which was mounted on a piezoelectric nanopositioner (Physik Instrumente P-563.3CD) placed on an inverted microscope (Nikon TE2000-U). The output from a Ti:Sapphire mode-locked laser (Coherent Mira 800 nm, 120 fs, 76 MHz) was routed through a half plate/polarizer combination to control the average power. The beam was then passed through a shutter and then made to overfill the back aperture of an infinity corrected microscope objective (Nikon plan-achromatic 60×, 1.4 NA oil). A drop of IP-Dip photo-polymer was placed on the objective and a fabrication file was loaded in the computer. The computer controlled the motion of the nanopositioner to achieve a patterned exposure within the photo-polymer (Kuebler and Rumi, *Nonlinear optics-applications: three-dimensional microfabrication*, First ed., Encyclopedia of Modern Optics (Eiseivier, 2004), 189-206).

The laser exposed sample was developed by immersing the sample in a propylene glycol mono methyl ether (PG-MEA) bath. The development process was repeated four times to remove all the unexposed resin followed by immersing in isopropyl alcohol bath for 5 min and finally deionized water bath for 5 min. The SVPC remained as a free standing structure on the SU-8 layer.

The sample was characterized using a modified version of a setup previously described (Digaum et al., 2014, *Optics Express* 22(21):25788-804). The vertically polarized output of a femtosecond optical parametric amplifier (Coherent) tuned to a center wavelength of $\lambda_0$=1.55 µm was routed to an objective which focused the beam into an optical fiber (Thorlabs 1550 BHP, 9 µm core diameter). The end face of the fiber near the structure was chemically etched for 8 hrs using buffered oxide etch (J. T. Baker 1178-03) to reduce the outer cladding diameter to circa 30 µm. Similar fibers were also placed at the other three sides of the structure and coupled with detectors to measure the light emanating from all sides.

B. Results and Discussion

The beam-bending efficiency of these devices was found to be most efficient at 2.94 µm when the fill factor was near 50%. The SVPCs were able to steer an unguided beam around a 90 turn with $R_{bend}$ as small as 6.4$\lambda_0$.

To realize SVPCs that function at the telecommunication wavelength of 1.55 µm, SVPCs with a targeted lattice spacing of 1.094 µm were fabricated in IP-Dip using MPL. The structure was fabricated on top of a 100 µm tall pillar with a stand of 10 µm column at the center of the pillar to enable free movement of optical fiber during characterization. A unit cell at the center of the lattice was selected to measure the width and length of the rods and columns. The dimensions of the rods and columns were used to estimate the fill factor and spacing of the lattice. The fill factor of the lattice was 41% and the lattice constant is 0.98 µm±0.03 µm, which is close to the targeted lattice constant of 1.094 µm.

The optical performance of the SVPC was tested. Horizontal line scans of the intensity of light emanating from different faces of SVPC revealed that the SVPC can bend light through the turn with 12% efficiency.

Figure 16A:
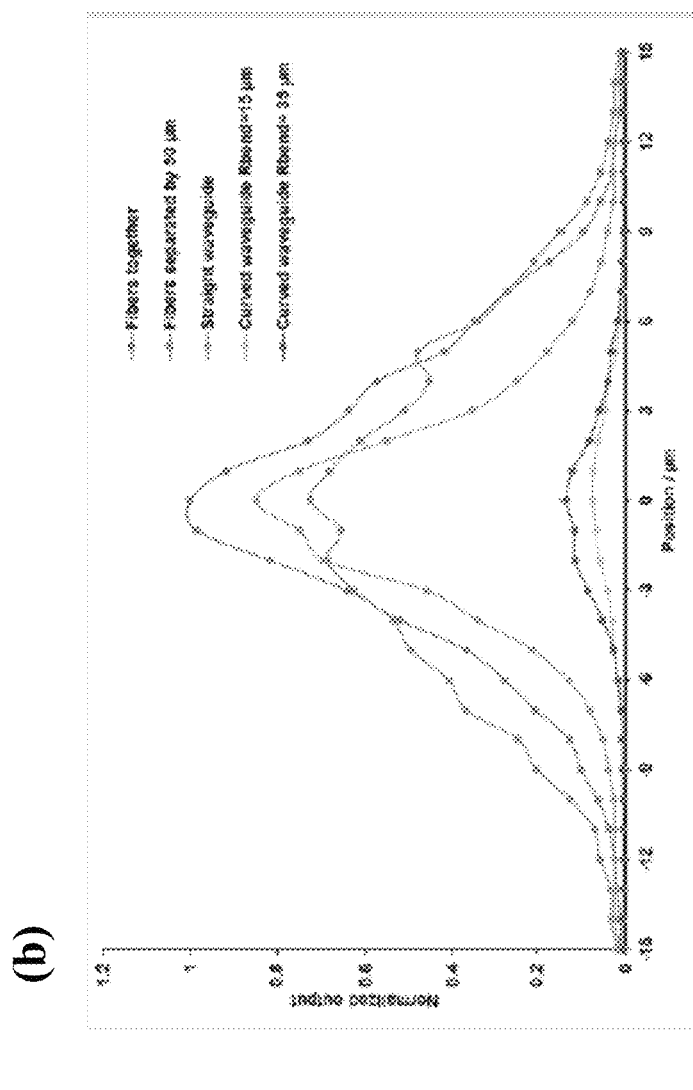
FIGS. 16A-16B.
Figure 16B:
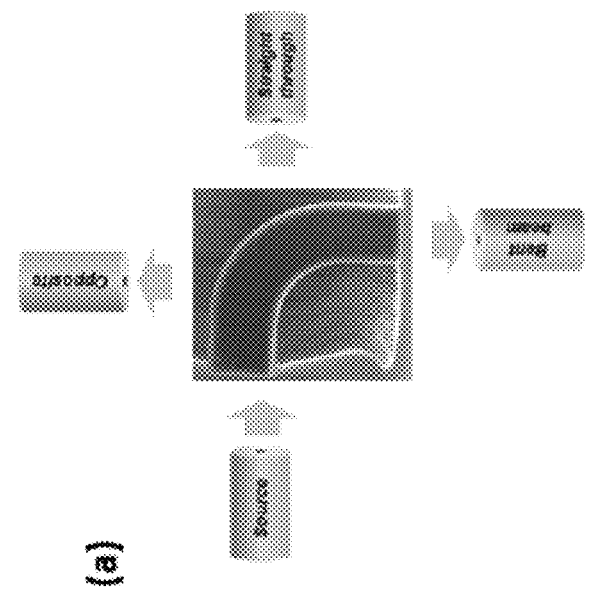
Figure 17:
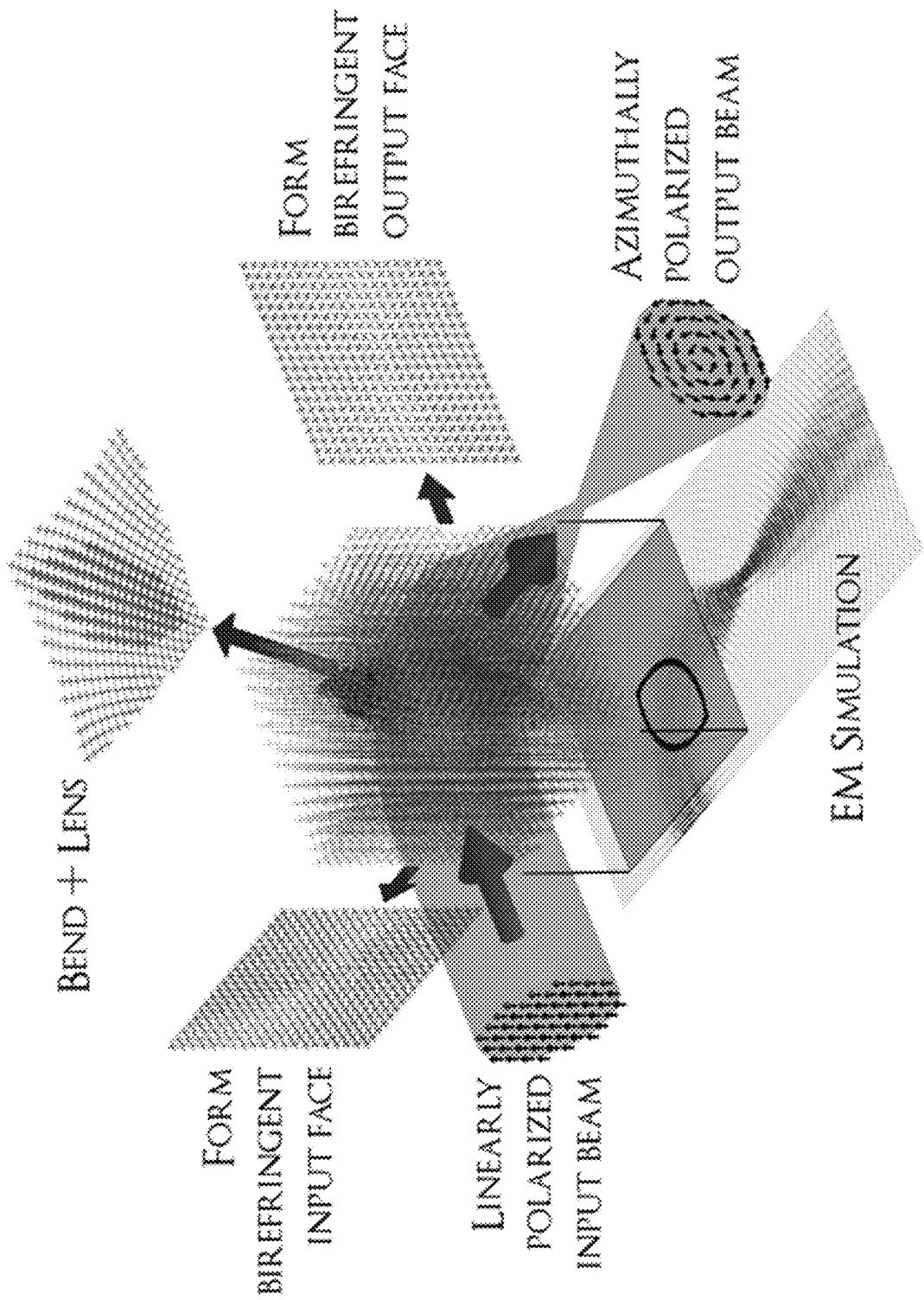
FIG. 17. Concept drawing for lattice with three functions multiplexed into the same volume of space. Longitudinal orientation controls the direction power flows, transverse orientation manipulates polarization, and fill factor controls phase to prove the lens function.

To compare the light guiding efficiency of SVPCs and waveguides, a range of curved and straight waveguides were fabricated with $R_{bend}$ varying from 35 µm down to 15 µm. The waveguides were optically characterized at a wavelength of 1.55 µm. The measurement fibers were scanned across the output face of the waveguide to obtain line scans of the output intensity profile. Curve labelled "fibers together" shows the intensity profile obtained when there is no waveguide present and the "source" and "straight-through" fibers are brought close enough to be nearly butt-coupled to one another. This scan gives the maximum efficiency for coupling into the detection fiber, and all other measurements were normalized to the peak of the "fibers together" curve (FIG. 16). The source and straight-through fibers were then separated by 50 µm to measure the free-space coupling between them over this distance. The FWHM of the curve increases relative to the "fibers together" trace, due to divergence of the beam over 50 µm. When a straight waveguide with a length of 50 µm was placed between the source and the straight-through fiber the trace narrows and intensifies indicating that waveguide transports light efficiently and with less divergence than free-space propagation over the same distance. However, when the straight waveguide was replaced by a curved waveguide having $R_{bend}$=35 µm the output reduced sharply to 13% of its peak value. The efficiency decreased further to 8% when the bend radius was decreased to 15 µm. Thus, although the waveguides fabricated by MPL are functional, they become highly loss when the turn radius is small. In contrast, the SVPC bends light with greater efficiency and through a tighter 90 µm than the conventional waveguides.

SVPCs having a volumetric fill factor of 41% were shown to be capable of bending light beams having a wavelength of 1.55 µm through a 90° turn with a bend-radius as small as 6.4$\lambda_0$ at an efficiency of 12%. Curved waveguides having similar bend-radius were fabricated and their optical performance was compared to that of the SVPCs. The beam-bending efficiency of the waveguides was found to decrease sharply as the bend radius decreased. Overall, the tightly-bent waveguides, which function via total internal reflection, do not perform as well as the SVPCs, which bend beams through the self-collimation effect. This example shows that SVPCs can be used to steer light at the telecommunications wavelength of 1.55 µm. The ability to guide light at telecommunications wavelengths opens up a range of applications in the field of integrated photonics.

Example 2

Spatially Variant Protonic Crystals

At a macroscopic level, devices designed by TO are based solely on refraction, so they are limited in this regard. Periodic structures provide mechanisms besides refraction that can provide more abrupt control of electromagnetic waves using more realistic material properties. This section discusses two concepts using spatially variant photonic crystals (SVPCs) that outperform any device to date designed using spatial transforms. Photonic crystals, however, are based on resonance so they are fundamentally bandwidth limited. In principle, devices designed with spatial transforms are not bandwidth limited because they are based on refraction, which is not sensitive to frequency in the absence of dispersion. However, the underlying periodic structures producing the effective properties often rely on resonant phenomena that are bandwidth limited.

Abrupt bends using spatially variant self-collimation. Self-collimation is observed in photonic crystals where beams propagate without diverging and are forced to propagate along an axis of the lattice (Illiew et al., 2005, *Opt. Exp.* 13:7076-85; Kosaka et al., 1999, *Appl. Phys. Lett.* 74:1212-14; Lu et al., 2006, *Phys. Rev. Lett.* 96:173902; Rumpf and Pazos, 2013, *J. Opt. Soc. Am.*, 30:1297-1304; Shin and Fan, 2005, *Opt. Lett.* 30:2397-99; Witzens et al., 2002, *Sel. Top. Quantum Elect. IEEE J.* 8:1246-57). The phenomenon has also been applied to surface waves (Oh et al., 2007, *Opt. Express* 15:1205-10] including spoof surface plasmons [Kim et al. 2014, *Opt. Express* 22:4050-58; Yu et al. 2010, *Nat. Mater.* 9:730-35). It follows from the theory that beams can be made to flow along arbitrary paths inside these lattices by spatially varying the orientation of the unit cells (Gao et al. 2008, *J. Opt. Soc. Am A,* 25:791-95; Digaum et al. 2014, *Opt. Express* 22:25788-804; Rumpf et al. 2013, *Prog. Electromag. Res.* 139:1-14). These lattices cannot be designed by TO because the effective material properties are constant throughout. It is only the orientation of the unit cells that is adjusted. Self-collimation is based on diffraction instead of refraction so it can control waves over more abrupt length scales without requiring extreme material properties. To construct the input maps for the spatially variant lattice synthesis algorithm, it was only necessary to define the Poynting vector as a function of position. A map for a 90° bend was produced. In this case, it was only necessary to spatially vary the orientation of the unit cells, not the lattice spacing or fill fraction. No coordinate transform was needed and TO was circumvented in this manner.

The first demonstration of a self-collimating SVPC was at microwave frequencies (Rumpf et al. 2013, *Prog. Electromag. Res.* 139:1-14). This device operated at around 15 GHz and flowed an unguided beam around a sharp 90° bend. Soon after, an SVPC with lattice spacing of 2.0 μm was demonstrated at optical frequencies at a vacuum wavelength of 2.94 μm (Digaum et al. 2014, *Opt. Express* 22:25788-804). The bend radius for both devices was around $6.4\lambda_0$. The three-dimensional nanophotonic lattice was fabricated by multi-photon direct laser writing (DLW) in the photopolymer SU-8. DLW is a nanoscale digital manufacturing technique similar to three-dimensional printing, which can be used to create free-standing three-dimensional structures in a variety of materials, including common photopolymers. The method of DLW has been thoroughly described in (Kuebler and Rumi, 2004, *Nonlinear optics-applications: three-dimenstinal microfabrication,* 189-206, Oxford, UK, Elsevier; LaFaratta et al., 2007, *Agnew. Chem. Int. Ed.,* 46:6238-58; Li and Fourkas, 2007, *Mater. Today* 10:30-37) and the details of the particular implementation used herein are described in (Williams et al., 2012, *Opt. Express* 20:25030-40). At near-infrared wavelengths, SU-8 has a refractive index of around 1.57 (Digaum et al. 2014, *Opt. Express* 22:25788-804). This is similar to that of other photopolymers, but it is small compared with the refractive index most typically used for photonic crystals. Through simulation, it was determined that the best performance was expected for a volumetric fill fraction of roughly 50% (Rumpf and Pazos, 2013, *J. Opt. Soc. Am.,* 30:1297-1304). This was later confirmed experimentally.

A scanning electron microscope image of an optical SVPC with a volumetric fill fraction of 52% was obtained. Its optical performance was measured by scanning optical fibers along the three exit faces of the SVPC, while a fourth fiber introduced source light onto the input face. The fibers were coupled to infrared detectors so the intensity of the light could be measured. Irradiance was measured relative to the input beam as the receive fibers were scanned across the SVPC faces. These data show that the SVPC effectively flows light towards the 'bent' face. The peak-to-peak ratio of the light exiting the 'bent' face to the light exiting the 'straight' face was 8.5:1. For this particular SVPC a strong signal is also seen at the 'opposite' face. From simulations, it was determined that this was caused by scattering at the edges of the lattice.

The beam bending efficiency can be optimized by adjusting the volumetric fill fraction of the SVPC. Three different SVPCs were fabricated with different fill fractions along with the resulting irradiance line scans measured at the 'bent' face. The beam-bending efficiency can be gauged from the peak-to-peak ratio of the irradiance scans measured at the 'bent' and 'straight'-through faces. Below a fill fraction of 40%, the peak-to-peak ratio is low and just above unity. At fill fractions above 55%, the peak-to-peak ratio is also low, falling below 0.5%. The highest beam-bending efficiency, with a ratio exceeding 8.5:1, is achieved for the SVPC having a fill fraction near 50%. Other functional aspects such as the angle through which the beam is bent, the degree of power splitting and the polarization selectivity can all be controlled through the design of the SVPC (Digaum et al. 2014, *Opt. Express* 22:25788-804).

Two SVPCs were produced that have an axial feature width of only 320 nm and axial unit cell spacing of 720 nm. These were fabricated by DLW in the photopolymer IP-Dip (Nanoscribe) using careful control of the exposure conditions to achieve the small size. This structure will bend light having $\lambda_0=1.0$ μm. Further improvements in the DLW processing and in the performance of the photopolymers should enable fabrication of SVPCs that can control light at $\lambda_0=850$ nm. This is the output wavelength of an important class of vertical cavity surface-emitting lasers (VCSELs). Controlling the output of these VCSELs is of interest for enabling new architectures for chip-to-chip optical interconnects and optical networking (Doany et al., 2012, *J. Lightwave Tech.* 30:560-71).

Controlling deformations becomes critical when a beam is to be flowed around more than one bend because the spatial variance is more complicated. To demonstrate this, two SVPCs were generated using the self-collimating lattice described in (Hamam et al. 2009, *Opt. Express* 17:8109-118) to flow a beam through two very tight consecutive 90° bends. These were simulated using the finite-difference frequency-domain method (Rumpf, 2012, *Prog. Electromag. Res. B* 36:221-48), which has proved to be a highly effective tool for simulating devices incorporating spatially variant lattices. An SVPC was generated using the basic algorithm. The self-collimation effect was weakened by deformations that were most severe near the center of the lattice. This caused scattering and reduced transmission to below 50%. An SVPC was generated using the modified algorithm to improve the quality of the lattice. In this case, the beam flowed around both bends without any significant scattering or spreading of the beam. Transmission through the second SVPC approached 97%.

Example 4

Multi-Mode Waveguide Bends Based on Spatially Variant Band Gap Materials

More than 10 years ago, a surge of papers emerged on the topic of sharp bends in photonic crystal waveguides, but the vast majority of this work focused on single-mode devices (Chutinan and Noda 1999, *Appl. Phys. Lett.* 75:3739-41; Chutinan and Noda, 2000, *Phys. Rev. B* 62:4488-92; Mekis et al., 1996, *Phys. Rev. Lett.* 77: 3787-90; Tokushima et al., 2000, *Appl. Phys. Lett.* 76: 952-54). Multimode waveguides are of great interest for optical interconnects because different signals can be multiplexed onto different modes, increasing the information capacity (Gabrielli et al., 2012, *Nat. Commun.* 3:1217). Unfortunately, very little work can be found on the topic of sharp bends in multi-mode waveguides. Some research in multi-mode waveguide bends used TO (Gabrielli et al., 2012, *Nat. Commun.* 3:1217), while others studied photonic crystal waveguides (Frandsen et al., 2004, *Opt. Express.* 12:5916-21; Li et al. 2004, *Appl. Phys. Lett* 84:4699-701; Liu and Fan, 2013, *Opt. Express* 21:8069-75). For dense integration, it is desired to form sharp bends without causing inter-modal coupling that would scramble the signals multiplexed onto each mode. Inter-modal coupling remains the primary challenge for multi-mode waveguides. A multi-mode photonic crystal waveguide with a sharp bend was designed in (Liu and Fan, 2013, *Opt. Express* 21:8069-75) using a topology optimization, but it had limited bandwidth and it is not clear how well the method would extend to waveguides supporting more modes.

A preliminary study on multi-mode photonic crystal waveguides in spatially variant lattices suggests that this is a highly promising technique for realizing sharp bends while also suppressing coupling between the modes. The results from this preliminary study are summarized in FIG. 6. The devices were simulated using the same finite-difference frequency-domain method identified above. Each row in the figure shows the first three modes in a waveguide propagating around a bend of radius $3.2\lambda_0$. The first column shows the first-order mode in each waveguide, the second column shows the second-order mode, and the third column shows the third-order mode. The first row shows a dielectric waveguide in air with a width of $0.5\lambda_0$ and a core refractive index of 3.4. This is a very high contrast waveguide but showcases dielectric waveguides in their best case for guiding around tight bends. The shape of the modes changes through the bend, indicating that the bend has produced coupling between the modes. The third-order mode is also observed to be leaking out of the waveguide around the bend. The second row shows a uniform photonic crystal with a multi-mode waveguide removed from it which has a bend radius of $3.2\lambda_0$. This lattice possesses a band gap so there is no leakage from the waveguides, but the bend induced strong reflections that can be discerned from the field intensity in the plots. In addition, the intermodal coupling is obvious by looking at the mode profiles exiting the bends which no longer resemble the pure modes. The last row in the figure shows the same photonic crystal, but the lattice was spatially varied to form the bend of radius $3.2\lambda_0$. The lattices were generated using deformation control where the critical regions were defined to be the two rows of unit cells on either side of the waveguide. The quality of the lattice outside of these regions is poor, but these regions are not important to performance of the bend. Very clean transmission was observed for all three modes, suggesting the inter-modal coupling was virtually eliminated. While not shown here, similar lattices generated using the basic algorithm without controlling deformations were observed to leak from the waveguide because the deformations weakened the band gap.

The invention claimed is:

1. A multiplexing apparatus, comprising:
a controllably-modified spatially variant lattice, wherein, in an unmodified form, the spatially-variant lattice includes a plurality of unit cells characterized by at least a size, a shape, a symmetry, a pattern, an orientation, a periodicity, a fill-factor, a chirality, self-collimation, and a lattice spacing, further wherein, in a controllably-modified form, the spatially-variant lattice is characterized by at least two contemporaneously-varied characteristics of the plurality of unit cells selected from the group of at least a controllably-modified size of the unit cells, a controllably-modified functionally graded orientation of the unit cells, a controllably-modified functionally graded fill-factor of the unit cells, a controllably-modified functionally graded lattice spacing, a controllably-modified spatially varied pattern within the unit cells, a controllably-modified spatially varied rotation of the unit cells, a controllably-modified spatially varied lattice symmetry, and a controllably-modified chirality of the unit cells, such that the controllably-modified spatially-variant lattice enables at least two multiplexed functions of a transmission between an input and an output of the lattice.

2. The apparatus of claim 1, wherein the spatially variant lattice is a spatially variant photonic crystal (SVPC).

3. The apparatus of claim 1, wherein the lattice spacing is $0.1\lambda_0$ to $1.0\lambda_0$.

4. The apparatus of claim 1, wherein the unit cell is one of a cubic, tetragonal, orthorhombic, and hexagonal unit cell.

5. The apparatus of claim 1, wherein the unit cells of the lattice comprise at least one material selected from a polymer, a photoresist, a chemically amplified resist, a chalcogenide, a semiconductor, a network solid, a glass, a metal, an alloy, a liquid crystal, a liquid crystal polymer, a polymer composite, nanoparticles, or a nanoparticle composite.

6. The apparatus of claim 5, wherein the semiconductor is silicon or gallium nitride, gallium arsenide, or silicon nitride.

7. The apparatus of claim 5, wherein the material is a glassy or crystalline oxide, including but not limited to silica, titanium dioxide, zirconium oxide, and aluminum oxide.

8. The apparatus of claim 1, wherein the lattice is configured to flow electromagnetic radiation having a vacuum wavelength of $\lambda_0$ to a common location independent of angle and/or position of incidence.

9. The apparatus of claim 1, wherein the at least two multiplexed functions are selected from the group of at least focusing, bending, collimating, lensing, steering, relaying, imaging, splitting, combining, filtering, rotating, polarizing, processing, switching, performing a logic function, mode coupling/decoupling, controlling an intensity, controlling a power, and controlling a phase of the transmission between the input and the output of the lattice.

10. The apparatus of claim 1, wherein the transmission is one of electromagnetic, vibrational, fluidic.

11. The apparatus of claim 1, wherein the transmission is an optical beam.

12. The apparatus of claim 1, wherein the lattice comprises multiple regions, further wherein each region enables at least three multiplexed functions.

13. The multiplexing apparatus of claim 1, wherein a material within a volume of the lattice that is not part of the lattice itself, called the interstitial regions, is one of a vacuum, air, a gas, condensed matter, a solution, a polymer, a chalcogenide, a semiconductor, a network solid, an oxide glass, a metal, an alloy, a liquid crystal, a liquid crystal polymer, a polymer composite, nanoparticles, or a nanoparticle composite.

14. A method for multiplexing a spatially variant lattice apparatus, comprising:
providing a spatially-variant lattice that includes a plurality of unit cells characterized by at least a size, a shape, a symmetry, a pattern, an orientation, a periodicity, a fill-factor, a chirality, and a lattice spacing; and
contemporaneously varying at least two characteristics of the plurality of unit cells selected from the group of at least a controllably-modified size of the unit cells, a controllably-modified functionally graded orientation of the unit cells, a controllably-modified functionally graded fill-factor of the unit cells, a controllably-modified functionally graded lattice spacing, a controllably-modified spatially varied pattern within the unit cells, a controllably-modified spatially varied rotation of the unit cells, a controllably-modified spatially varied lattice symmetry, and a controllably-modified chirality of the unit cells, enabling at least two multiplexed functions of a transmission between an input and an output of the lattice.

15. The method of claim 14, further comprising multiplexing at least two functions of a transmission between an input and an output of the spatially-variant lattice selected from the group of at least focusing, bending, collimating, lensing, steering, relaying, imaging, splitting, combining, filtering, rotating, polarizing, processing, switching, performing a logic function, mode coupling/decoupling, controlling an intensity, controlling a power, and controlling a phase of the transmission between the input and the output of the lattice.

16. The method of claim 14, wherein the transmission is an electromagnetic wave/beam.

17. The method of claim 16, wherein the transmission is an optical wave/beam.

\* \* \* \* \*

UNITED STATES PATENT AND TRADEMARK OFFICE
CERTIFICATE OF CORRECTION

PATENT NO.       : 10,824,045 B2
APPLICATION NO.  : 15/627060
DATED            : November 3, 2020
INVENTOR(S)      : Raymond C. Rumpf et al.

Page 1 of 1

It is certified that error appears in the above-identified patent and that said Letters Patent is hereby corrected as shown below:

On the Title Page

Item (72), insert --Javier Jair Pazos, El Paso, TX (US)-- after Cesar Luis Valle, El Paso, TX (US)

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*